United States Patent
Hong et al.

[11] Patent Number: 6,091,737
[45] Date of Patent: Jul. 18, 2000

[54] REMOTE COMMUNICATIONS SERVER SYSTEM

[75] Inventors: Kevin Hong, Spring Lake Park, Minn.; Bhat V Damodar, Bangalore; Sundararajan Narasimhan, Banglore, both of India; Dale W. Martenson, Mounds View, Minn.; Raghu Sharma, North Oaks, Minn.; Jeffrey P. Davis, Ham Lake, Minn.; Gregory R. Johnson, New Brighton, Minn.

[73] Assignee: Multi-Tech Systems, Inc., Mounds View, Minn.

[21] Appl. No.: 08/970,644

[22] Filed: Nov. 14, 1997

Related U.S. Application Data

[60] Provisional application No. 60/033,201, Nov. 15, 1996.

[51] Int. Cl.[7] .............................. H04L 12/28; H04L 12/40
[52] U.S. Cl. ............................................ 370/431; 370/438
[58] Field of Search .................................... 370/431, 432, 370/433, 435, 437, 438, 439, 448, 401; 375/222; 395/200.47, 200.49

[56] References Cited

U.S. PATENT DOCUMENTS

| | | | |
|---|---|---|---|
| 5,172,373 | 12/1992 | Suzuki | 370/438 |
| 5,416,776 | 5/1995 | Panzarella et al. | 370/85.11 |
| 5,438,614 | 8/1995 | Rozman et al. | 379/93 |
| 5,450,425 | 9/1995 | Gunn et al. | 371/67.1 |
| 5,528,595 | 6/1996 | Walsh et al. | 370/85.13 |
| 5,598,536 | 1/1997 | Slaughter | 395/200.49 |
| 5,732,079 | 3/1998 | Castrigno | 370/438 |
| 5,764,639 | 6/1998 | Staples | 370/401 |
| 5,812,819 | 9/1998 | Rodwin | 395/500 |

*Primary Examiner*—Ajit Patel
*Assistant Examiner*—Ricardo M. Pizarro
*Attorney, Agent, or Firm*—Schwegman, Lundberg, Woessner & Kluth, P.A.

[57] ABSTRACT

A remote communications server system enables multiple remote users simultaneous access to a network. The system connects a plurality of on-line sessions across multiple communication lines to the network. A unique combination of multiple buses, multiple processors, and a segmented design creates a distributed processing communications system having high throughput without the stability problems associated with gigabit bus speeds. Furthermore, the system supports a mixture of communication links and allows the substitution of one service type for another without affecting the remaining communication links. The system is scalable in that segments can be added as needed and the number of lines handled by a segment can be increased.

14 Claims, 26 Drawing Sheets

REMOTE COMMUNICATIONS SERVER SYSTEM

CROSS-REFERENCE TO RELATED APPLICATIONS

This application is a non-provisional application claiming benefit under 35 U.S.C. § 119(e) of U.S. Provisional Application No. 60/033,201, filed Nov. 15, 1996, which is hereby incorporated by reference.

FIELD OF THE INVENTION

The present invention is related to data communications and in particular to data communications between multiple dial-up connections and a network.

BACKGROUND OF THE INVENTION

Previously, Internet service providers (ISPs) supported multiple simultaneous connections between the Internet and users dialing into the ISP by deploying many modems connected to multiple telephone lines. Each dial-in user connects to a particular modem which is in turn connected to an Internet router which routes data between the user and the Internet. Each modem has to be individually configured and monitored for failure.

The introduction of intelligent modem racks containing multiple modems and connected to a single telephone line, such as a T1 line or an ISDN line, that supports multiple simultaneous calls has allowed the ISPs more control over their infrastructure. However, in order to support the high speeds required by Internet users, the data bus on the rack is expensive, complex, and prone to failure. Furthermore, the racks are dedicated to a single type of telephone connection, either T1 or ISDN, not both, and are not easily scalable. Finally, although the racks give more control over modem management, ISP personnel cannot easily perform the management functions remotely.

Thus, there is a need for a scalable and reliable modem system that provides flexibility in the type of line connections configurable, and is easily managed from a remote site.

SUMMARY OF THE INVENTION

A communications server system manages communication sessions between multiple remote users and a network by distributing the processing necessary to establish and maintain the session among multiple processors connected to multiple busses. The communications sessions are divided into connection segments which are coupled to a network interface through a first bus. The network interface receives outgoing network packets from a connection segment on the first bus and transmits the outgoing network packets to the network. The network interface also receives incoming network packets from the network and transmits the incoming network packets to a connection segment on the first bus.

Each connection segment is coupled to a second bus and comprises a communications module for coupling to a telephone line and a remote access server microprocessor that control the communications sessions through the specific segment. The communications module converts incoming telephone signals from the remote users into frames of incoming telephone data and transmits the frames of incoming telephone data on the second bus. The communications module also converts frames of outgoing telephone data received on the second bus into outgoing telephone signals for the remote users. The remote access server microprocessor converts the frames of incoming telephone data received on the second bus into outgoing network packets and transmits the outgoing network packets on the first bus. The remote access server microprocessor also converts the incoming network packets received on the first bus into frames of outgoing telephone data and transmits the frames of outgoing telephone data on the second bus.

When the communications segment is connected to a T1 telephone line, the communications module comprises a T1 connection line interface which demultiplexes/multiplexes between telephone signals from/to the remote users and service channels contained in the T1 signal. A plurality of modem modules are coupled to the T1 connection line interface on a segment bus. Each modem module comprises a plurality of modems and a controller.

When the communications segment is connected to primary rate ISDN (PRI) line, the communications module comprises a PRI communications line interface. If the PRI signals are modulated, the communications module further comprises a plurality of modem modules as in the T1 case.

When the communications segment is connected to a basic rate ISDN line (BRI), the communications module comprises a plurality of BRI communications line interfaces and a plurality of modems.

The remote communications server system further comprises a system manager controller coupled to the plurality of connection segments through a third bus which transmits commands to each connection segment and receives status information from each connection segment.

A method of distributing the processing inherent in communications sessions between multiple remote users and a network by dividing the communication sessions into segments and dedicating a communications line interface and a processor to each segment is also described. The communications line interface and the processor in each segment are coupled to a data bus. A single network interface is assigned to all the segments and is coupled to the processors in the segments through a different data bus. If signals in a telephone line coupled to a communications line interface in a segment require modulation/demodulation, a plurality of modems is assigned to the segment. The plurality of modems is further divided into modem pools with each modem pool assigned a modem pool controller to manage the data traversing the modems in the pool. The modems in a pool and the modem pool controller are coupled through a third bus.

Software that converts among the various data protocols supported by the remote communications server system is described as is server management software.

Thus, the remote communications server system supports a plurality of communications sessions between multiple dial-in users and a network using a combination of buses, processors, and a segmented design that creates a distributed processing system having high throughput without the stability problems associated with gigabit bus speeds. Furthermore, the system provides flexible configuration because it supports a mixture of different types of telephone links and allows the substitution of one service type for another without affecting the remaining telephone links. The modular design also permits scalability by increasing the number of segments in use and/or the number of lines connected into each segment. Finally, because the system manager can be accessed through industry-standard remote protocols, the remote communications server system deployed at one site can be easily maintained from a different site.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The same reference number may used throughout the application to refer to an identical component which appears in multiple Figures. Signals and connections may be referred to by the same reference number or label when the actual meaning will be clear from its use in the context of the description.

System Overview

Figure 1A:
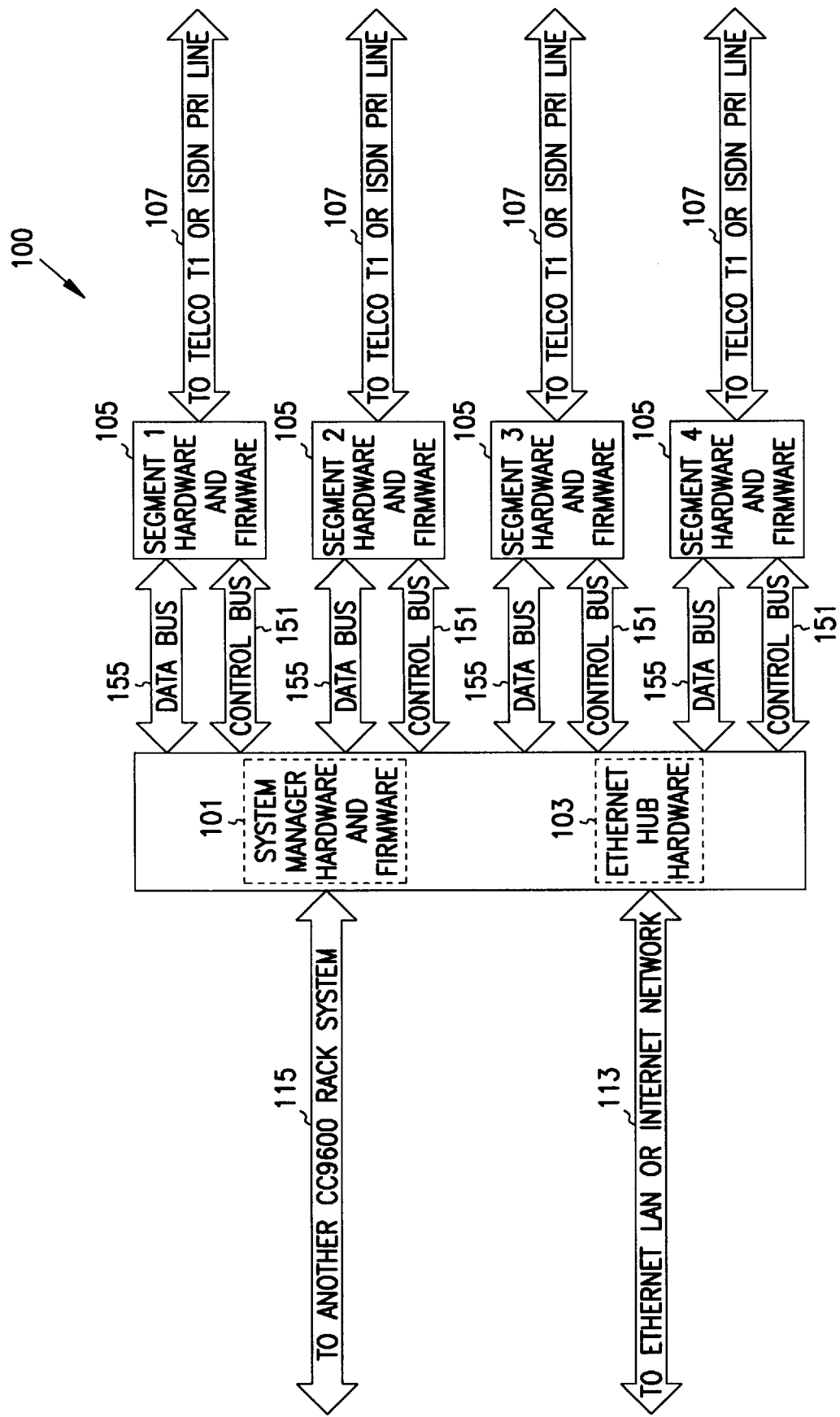
FIG. 1A is a logical block diagram of one embodiment of a communications server system comprising a system manager, an Ethernet hub, four connection segments, and connecting bus structures.
Figure 7:
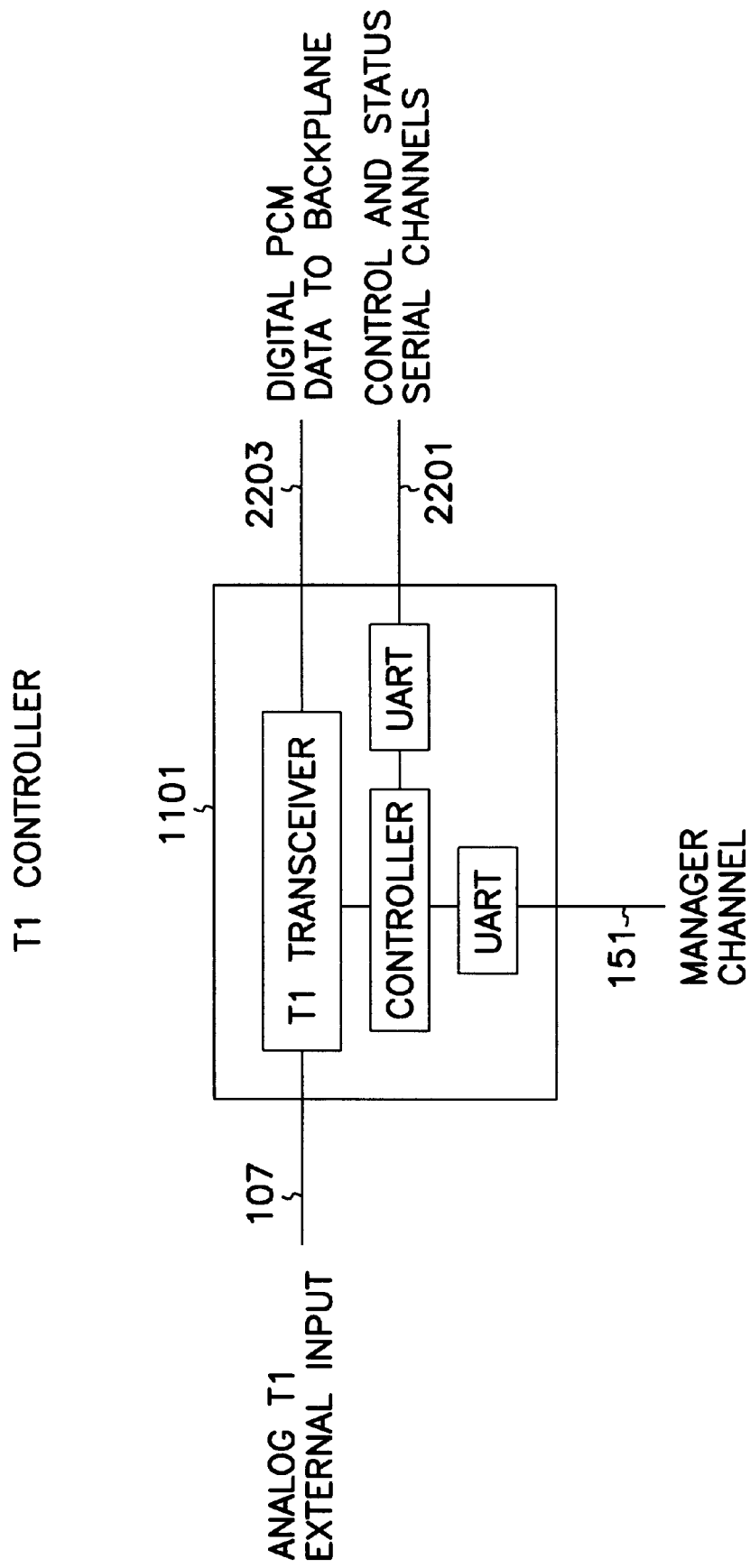
FIG. 7 is a block diagram representing one embodiment of a T1 module for the communications server system of FIG. 1A.

FIG. 1A shows an embodiment of the communications server system 100 comprising a system manager 101, an Ethernet hub 103, and four connection "segments" 105. A system containing fewer connection segments is also contemplated by the invention. The system manager 101 monitors the operation of the system components and environmental and physical changes that take place in the system 100 through a control bus 151. The system manager 101 is described in detail below in conjunction with FIGS. 4, 20 and 21. The Ethernet hub 103 connects the system 100 to an Ethernet-based network and when used with an IP (Internet Protocol) router connects users dialing into the system 100 with the Internet. The Ethernet hub 101 is shown in FIG. 7 and described in more detail below.

Each connection segment 105 further comprises a remote access server (RAS) module 121 and at least one connection line module. The connection line module is described below as communicating across either standard T1, or primary rate or basic rate ISDN telephone lines 107. The communications server system's 100 use of alternate physical communication connections such asynchronous transfer mode (ATM) networks, and frame relay networks will be apparent to those skilled in the art. In addition, segments 105 supporting different connection types can be intermixed in a system.

T1 phone lines provide twenty-four channels of digitized data transmitted at 1.544 megabits per second. Originally designed to carry digitized voice across standard POTS (plain old telephone service) circuits, each T1 channel, called a DS0 (data service level zero) channel, carries a PCM (pulsed code modulation) data stream having a specified voltage, or "logic level," at 64 kilobits per second. Twenty-four DS0 channels are multiplexed together to form a T1 line, with each DS0 channel carrying the signals for a single end-to-end connection. The multiplexed signal is divided into "D4 frames" with each D4 frame containing one eight-bit word from each of the twenty-four DS0 channels in a defined location in the frame called a "time slot." Thus, each end-to-end connection is assigned to a specific time slot in the multiplexed T1 signal. A sync bit is inserted at the end of the twenty-fourth time slot to denote the start of each frame. In order to communicate connection status information across a T1 line, the least significant bit in each time slot of every sixth ("A" bit) and twelfth ("B" bit)frame is used as a signaling bit. The A and B bits are the standard signaling method used in a POTS network and their various combinations represent connection status conditions such as on hook, off hook, disconnect, busy, etc. Standard T1 channel banks contain microprocessors that demultiplex the T1 input upon receipt and extract the status information from the data stream to determine the state of the connection. In order to prevent bits in the data stream from being sent at different rates in different telephone networks, the T1 service provider maintains a clock signal that is used by the T1 channel bank to ensure correct interpretation of the data stream.

ISDN (integrated service digital network) phone lines also carry PCM data for end-to-end connections. Unlike T1, however, the channel carrying connection status information (D or "delta" channel) is separate from the data channel (B or "bearer" channel). PRI service combines twenty-three multiplexed B channels running at 64 kilobits per second with a single D channel running at 16 or 64 kilobits per second. Standard commercially available ISDN chip sets process the status information in the D channel and multiplex/demultiplex the B channels. In its "native" mode, the data in the B channels is not modulated so a modem is not required.

Figure 1B:
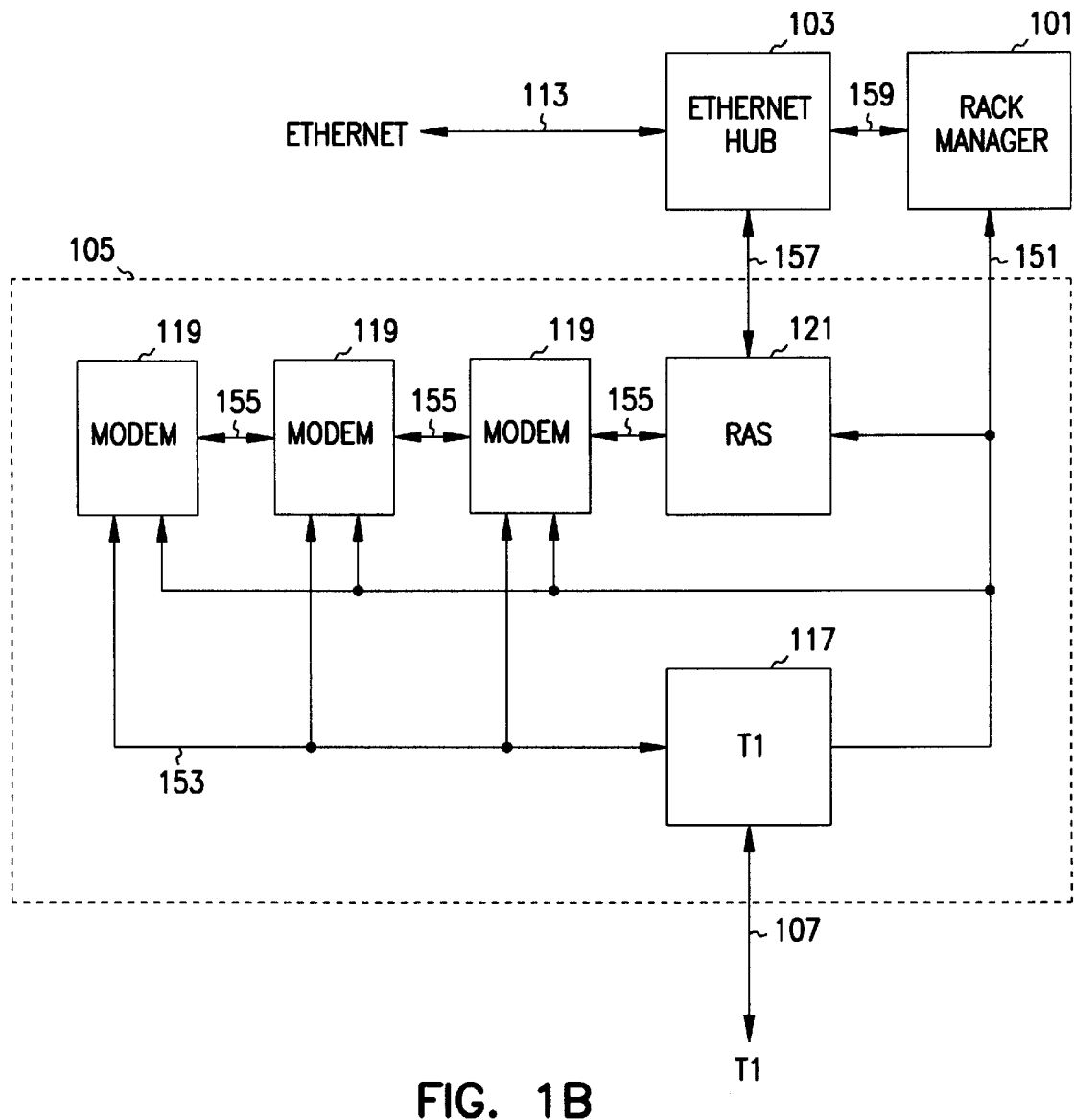
FIG. 1B is a logical block diagram of the communications server system of FIG. 1A showing components of a connection segment designed for a T1 connection, and logical data and control flows among the system manager, the Ethernet hub and the components of the segment.

The segment 105 shown in FIG. 1B is configured for T1 service. The T1 line 107 is coupled to a T1 connection line module 117. The T1 module 117 functions as a channel bank, multiplexing and demultiplexing the DS0 channels contained within the T1 signal. Each DS0 channel is assigned to a modem contained on one of the modem modules 119 in the segment. The exact number of modem units on a module and the number of modem modules 119 is dependent on the number of DS0 channels the segment supports. A segment 105 having three modem modules with eight modems per module provides the twenty-four modems necessary to handle the twenty-four separate DS0 channels present in a standard T1 line. However, fractional T1 service is available that contains fewer DS0 channels so alternate embodiments comprising few modems are contemplated by the invention as is the capability to support services, such as T3 or E1, which require more than twenty-four modems and thus each modem module would have more than eight modems. In one embodiment, each DS0 channel is statically assigned to a modem; in an alternate embodiment, the assignment is dynamic with a DS0 channel being coupled to an available modem for the duration of a communication session.

The DS0 channels serve as conduits for signals to and from the remote user through a data bus 153. When the remote user transmits a signal, the modem assigned to that channel demodulates the signal and passes the demodulated signal to the RAS module 121 on a data bus 155. RAS application software running in a microprocessor in the RAS module 121 determines the destination of the signal, addresses it accordingly, and sends it to the Ethernet hub 103 on a data bus 157 for delivery to the appropriate destination on the Ethernet network.

A signal destined for the remote user is received by the RAS module 121 from the Ethernet hub 103 and follows the same route in reverse. The RAS module 121 sends the signal to the appropriate modem which modulates it and passes the modulated signal to the T1 module 117 for transmission to the remote user.

Figure 1C:
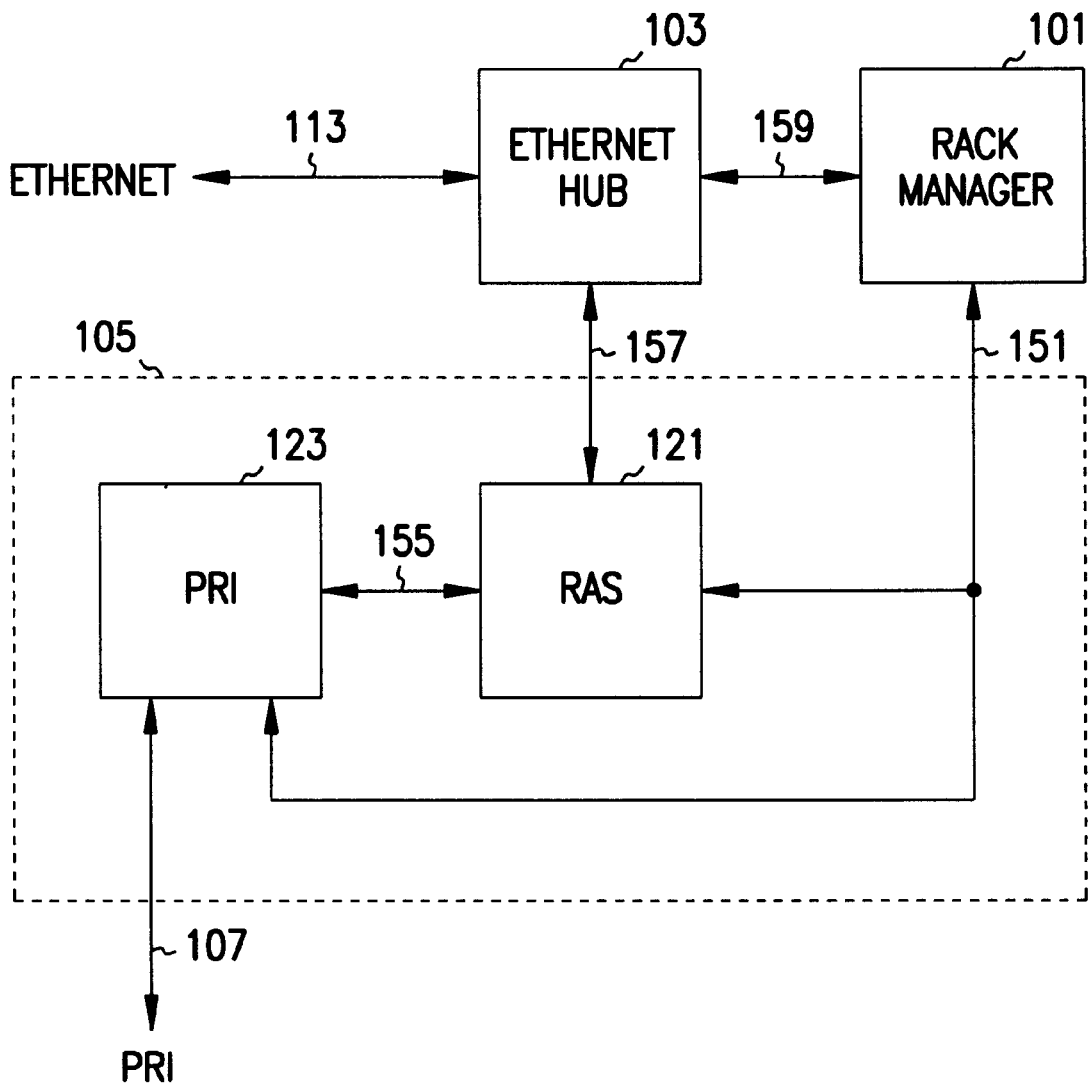
FIG. 1C is a logical block diagram of the communications server system of FIG. 1A showing components of a connection segment designed for a primary rate ISDN (PRI) connection, and logical data and control flows among the system manager, the Ethernet hub and the components of the segment.

In an embodiment of a connection segment shown in FIG. 1C, the T1 module 117 and the modem modules 119 have been replaced by a PRI module 123 coupled to an ISDN line 107. The PRI module 123 extracts and processes the connection status information in the D channel, and demultiplexes the incoming data in the twenty-three B channels and sends it directly to the RAS module 121 on the data bus 155. No modulation or demodulation is necessary on a native ISDN signal so there are no modems in this embodiment.

Figure 1D:
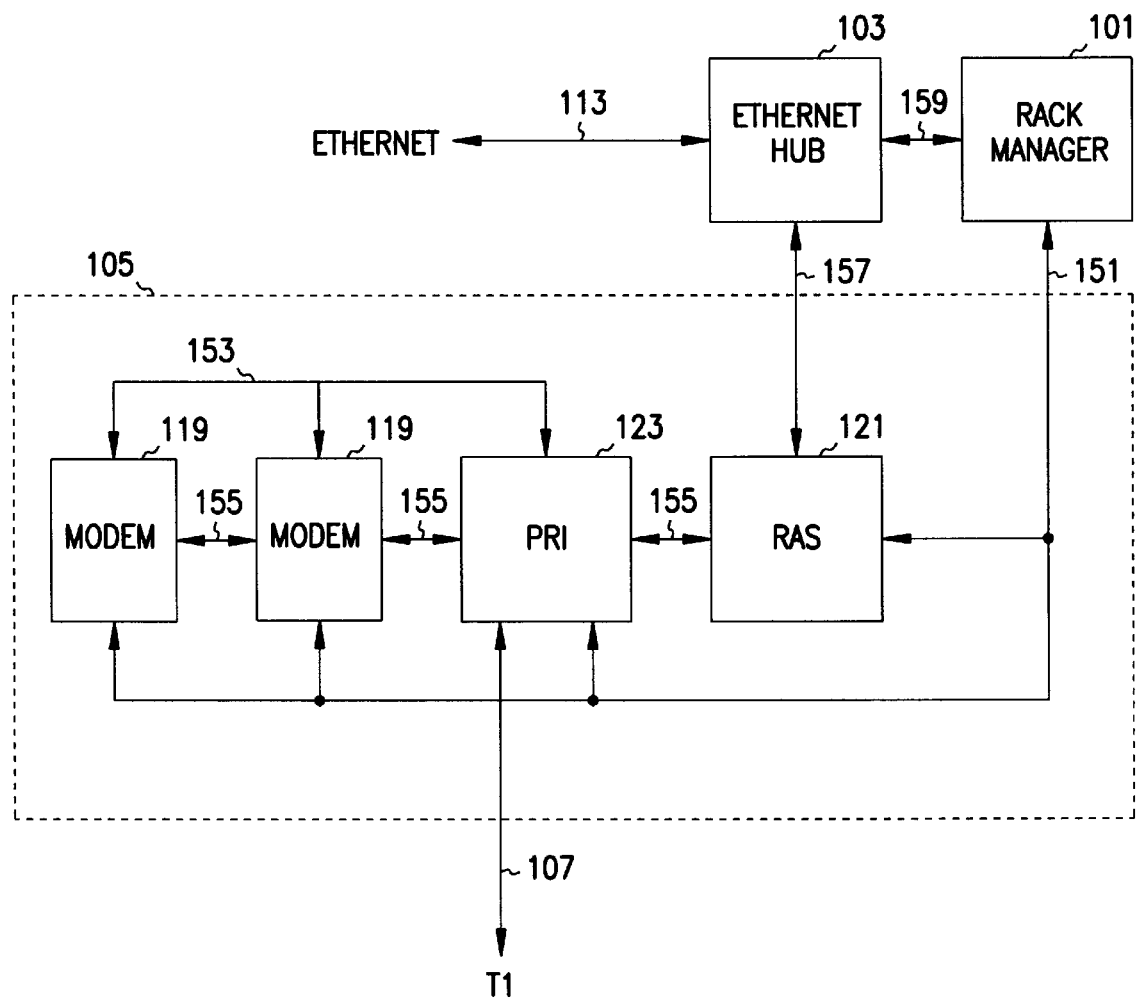
FIG. 1D is a logical block diagram of the communications server system of FIG. 1A showing components of a connection segment designed for handling analog data on a primary rate ISDN (PRI) connection, and logical data and control flows among the system manager, the Ethernet hub and the components of the segment.

In an alternate embodiment of an PRI connection segment shown in FIG. 1D, a B channel carries a modem signal that requires modulation/demodulation. The PRI module 123 extracts and processes the connection status information in the D channel. When the remote user is using an ISDN terminal adapter, the PRI module processes the B channels as described above in conjunction with FIG. 1C. However, if the remote user is using an analog modem, the PRI module assigns one of the modems connected on the data bus 155 to modulate/demodulate the signal exchanged with the RAS module 121.

Figure 23:
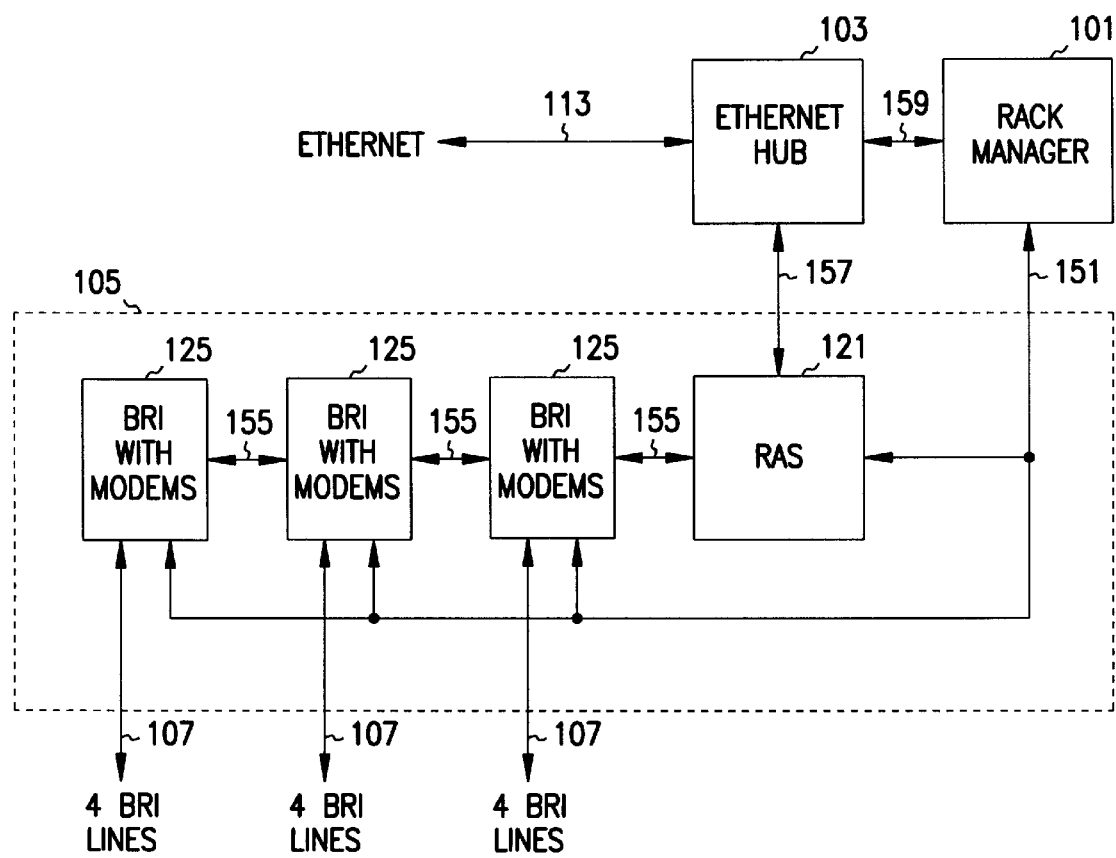
FIG. 23 is a logical block diagram of the communications server system of FIG. 1A showing components of a connection segment designed for a basic rate ISDN (BRI) connection, and logical data and control flows among the system manager, the Ethernet hub and the components of the segment.

FIG. 23 shows a one embodiment of a connection segment configured to handle basic rate ISDN (BRI) communications. Each BRI module 125 handles four BRI lines with one D channel and two B channels per line. Each BRI module 125 extracts the B channels and assigns analog signals in a B channel to one of eight modems contained within the BRI module 125. The modulated/demodulated signals are transmitted between the RAS module 121 and the BRI module 125.

The system manager 101 shown in FIGS. 1A–1D and 23 executes firmware that monitors the operation of the system 100 and provides remote diagnostic access to its management functions using standard communication software such as FTP (file transfer protocol), Telnet, Web browsers using HTTP (hyper-text transport protocol), and SNMP (simple network management protocol). The system manager firmware is described in more detail below.

The descriptions that follow should be read with reference to the system components shown in FIGS. 1A–1D and 23.

Hardware Description

Figure 2A:
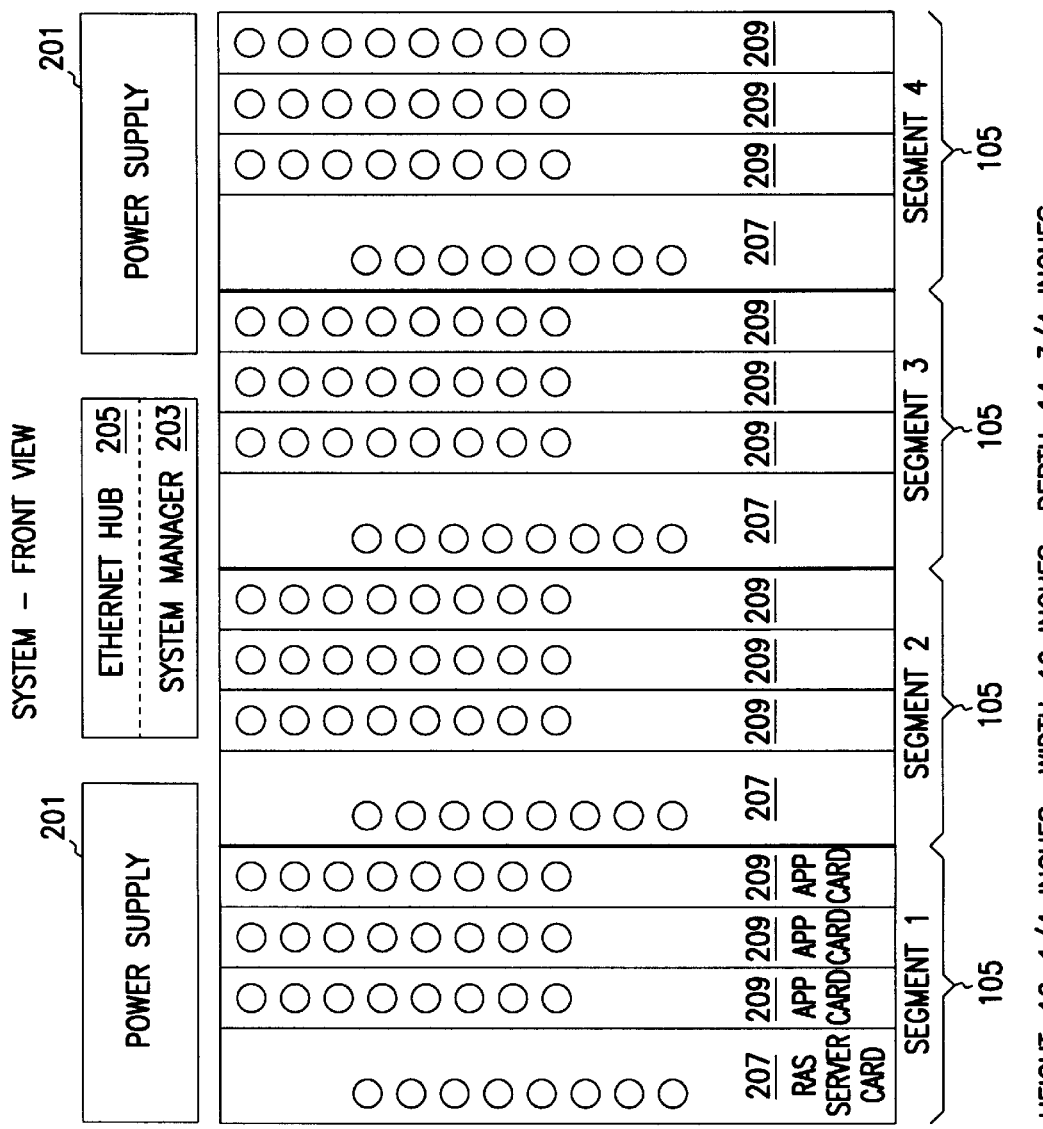
FIG. 2A is a block diagram representing the front view of the communications server system of FIG. 1A.
Figure 2B:
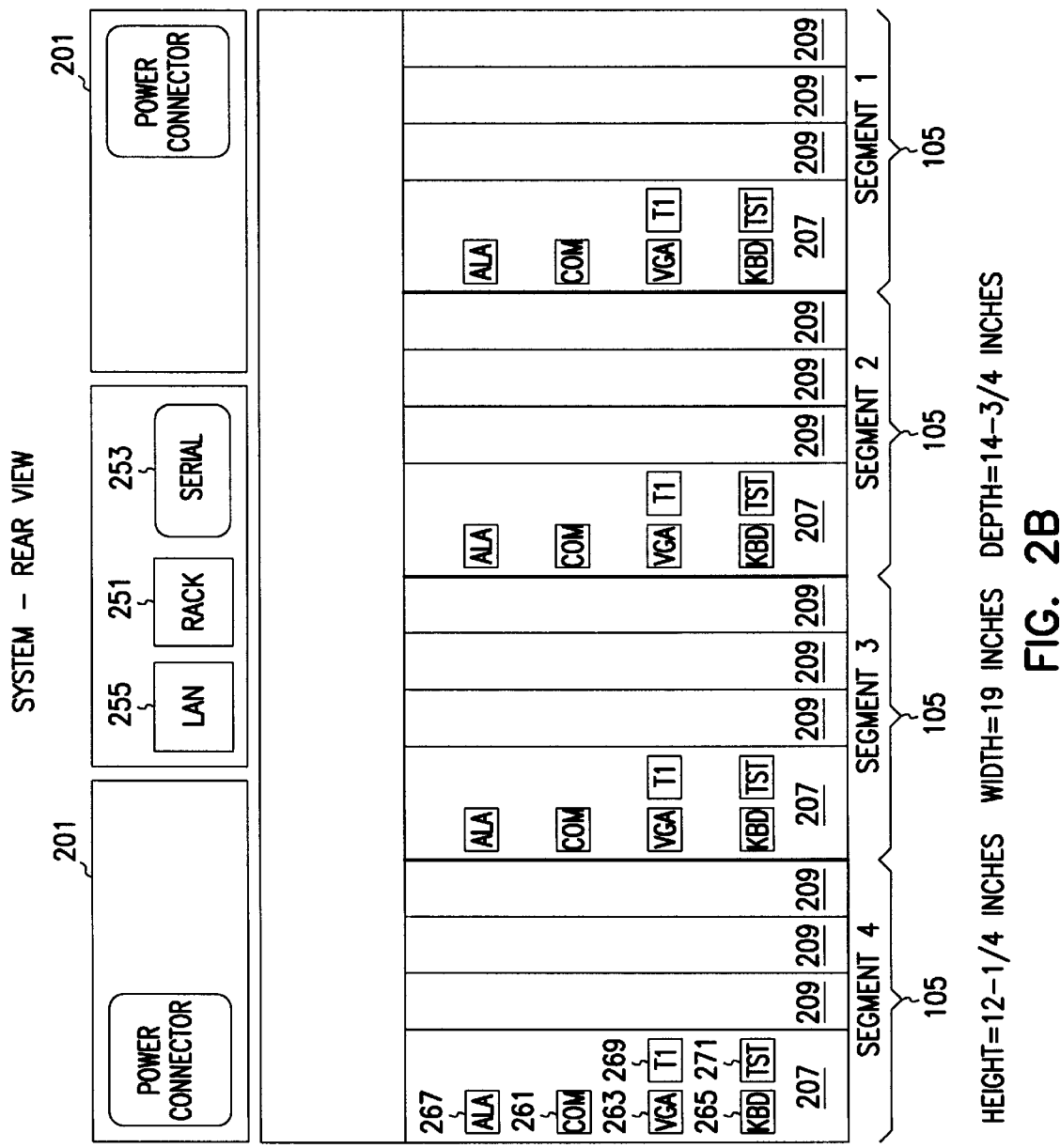
FIG. 2B is a block diagram representing the back view of one embodiment of the communications server system of FIG. 1A having four T1 connections.

FIGS. 2A and 2B are block diagrams representing front and rear views of an embodiment of the communications server system 100. In one embodiment, the components of system 100 are located in a rack mounted chassis vented through the sides; in another embodiment, the rack mounted chassis is vented through the front and back. Both of these embodiments prevent the common problem of overheating the components when a rack is stacked on top of another rack.

Power Supplies

Figure 3:
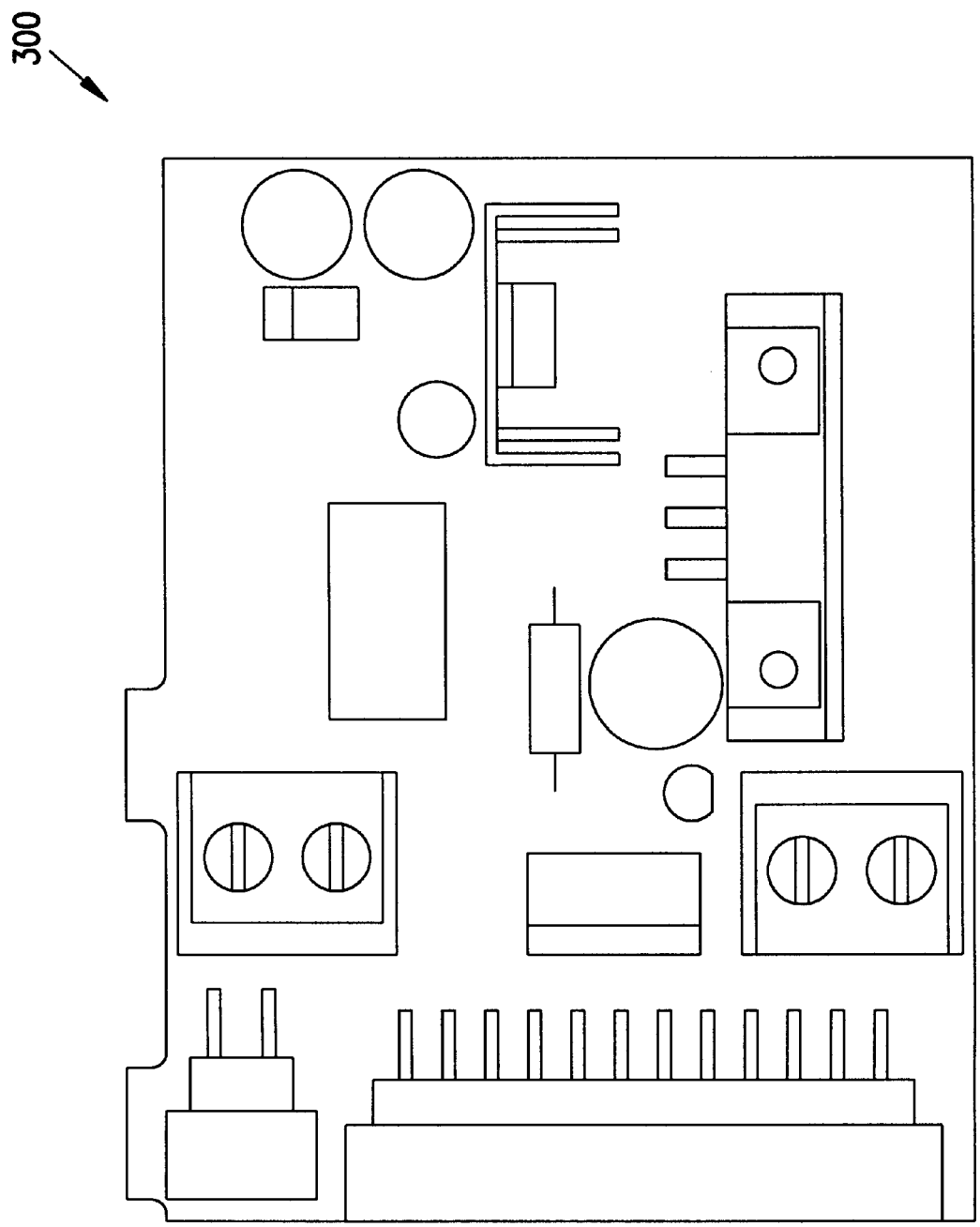
FIG. 3 is a block diagram representing one embodiment of a power supply card for the communications server system of FIG. 1A.

The communications server system 100 is powered by two power supplies 201, shown in detail in FIG. 3. FIG. 3 illustrates one embodiment of a power supply card 300 designed to interface with the backplane of the system 100 as described below. Under normal operation, the power supplies 201 share the power requirements of the system between them, but each is capable of powering the system in case of the failure of one. This arrangement ensures continued operation when switching to a single power supply and also enables the "hot-swapping" of power supplies without incurring down time.

System Manager

Figure 4:
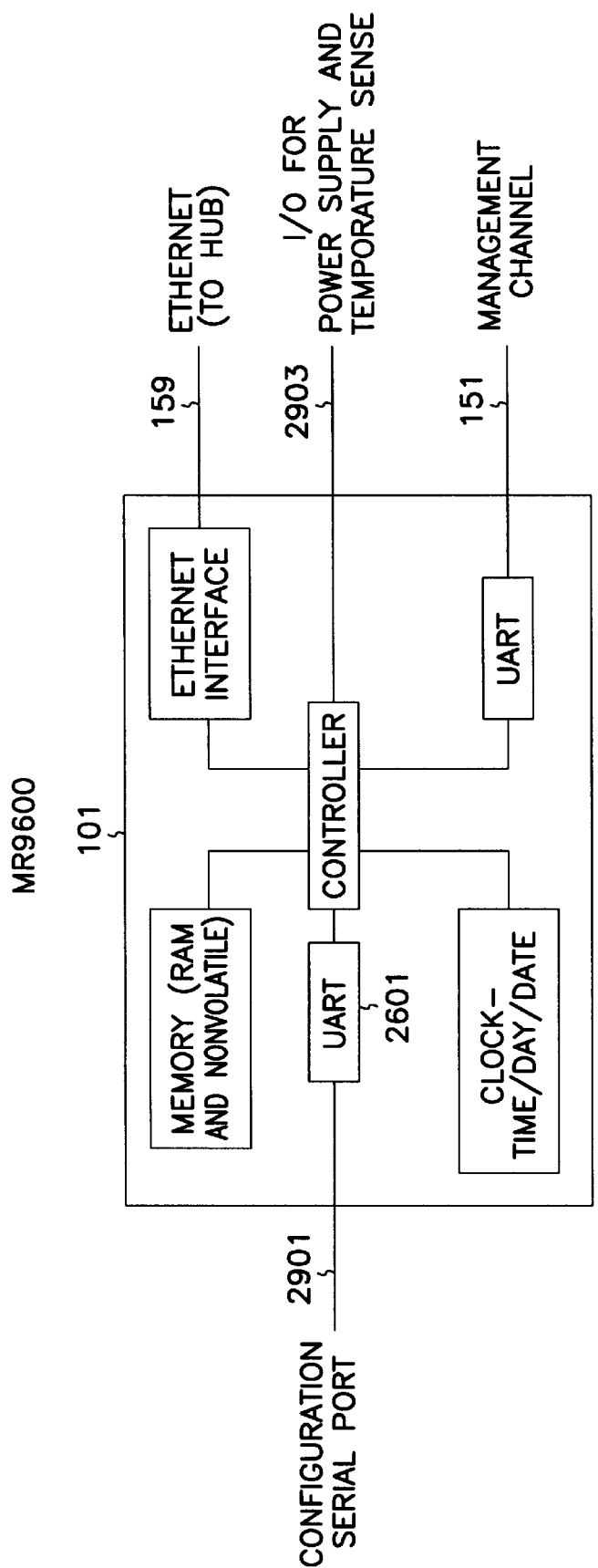
FIG. 4 is a block diagram representing one embodiment of a system manager module for the communications server system of FIG. 1A.

The hardware comprising system manager 101 shown in FIG. 2A is a card 203 designed to interface with the backplane of the system which provides the data lines 151 the system manager 101 uses to monitor the operations of the system 100. One embodiment of a system manager card 203 is shown in FIG. 4. The system manager card 203 contains two banks of RAM (random access memory) and Flash memory (i.e., programmable erasable read-only memory) 503, and a controller 501 which executes a firmware program described below in conjunction with FIG. 20.

Ethernet Hub

Figure 5:
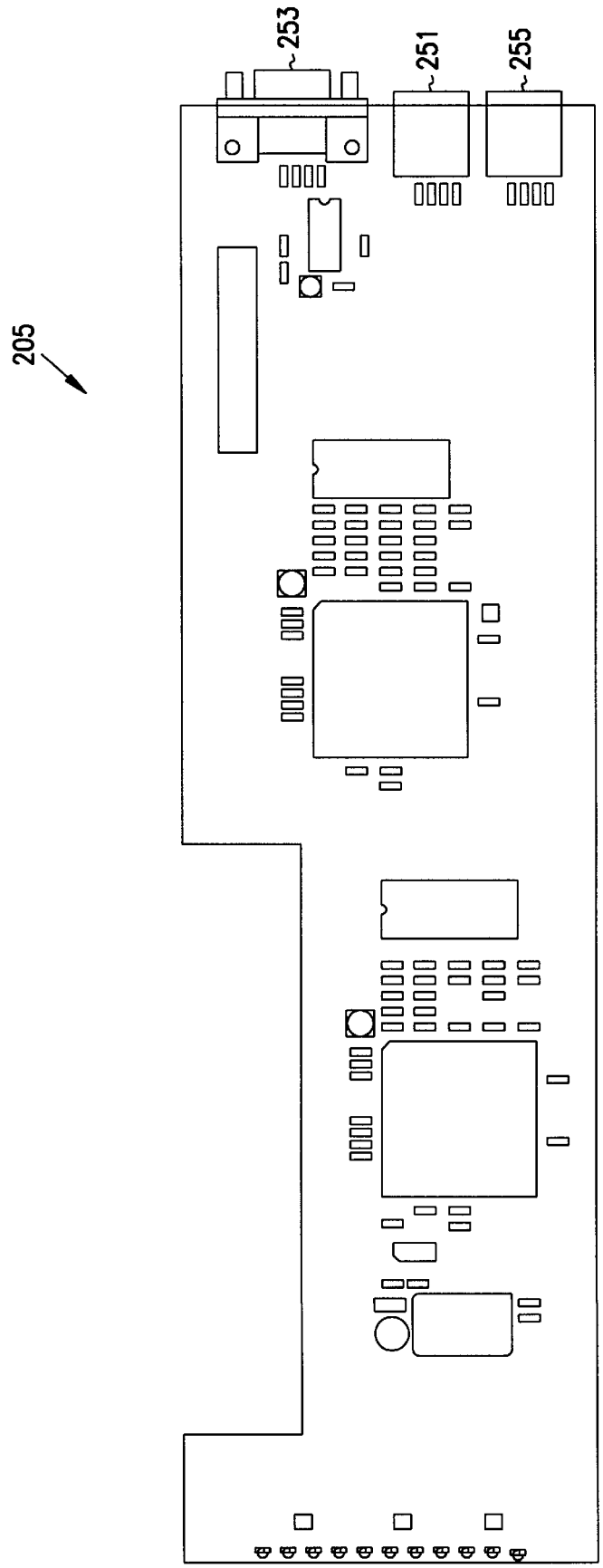
FIG. 5 is a block diagram representing one embodiment of an Ethernet card for the communications server system of FIG. 1A.

The Ethernet hub 103 (FIG. 1C) is also shown as a card 205 in FIG. 2A. FIG. 5 shows one embodiment of an Ethernet hub card 205 for the communications server system 100. In this embodiment, the Ethernet hub card 205 contains a serial port 253 and two Ethernet ports 251, 255 (labeled "rack" and "LAN" respectively) as illustrated in FIG. 2B. The Ethernet port 251 permits multiple communications server systems to be "daisy-chained" together without the need for external hubs. The serial port 253 is used for initial configuration of the communications server system 100 and for on-site maintenance operations. Alternate embodiments in which the system manager card 203 contains one or more of the connectors or in which the components of the system manager 101 and the Ethernet hub 103 are combined on one card will be apparent to those skilled in the art.

Segments

Figure 19:
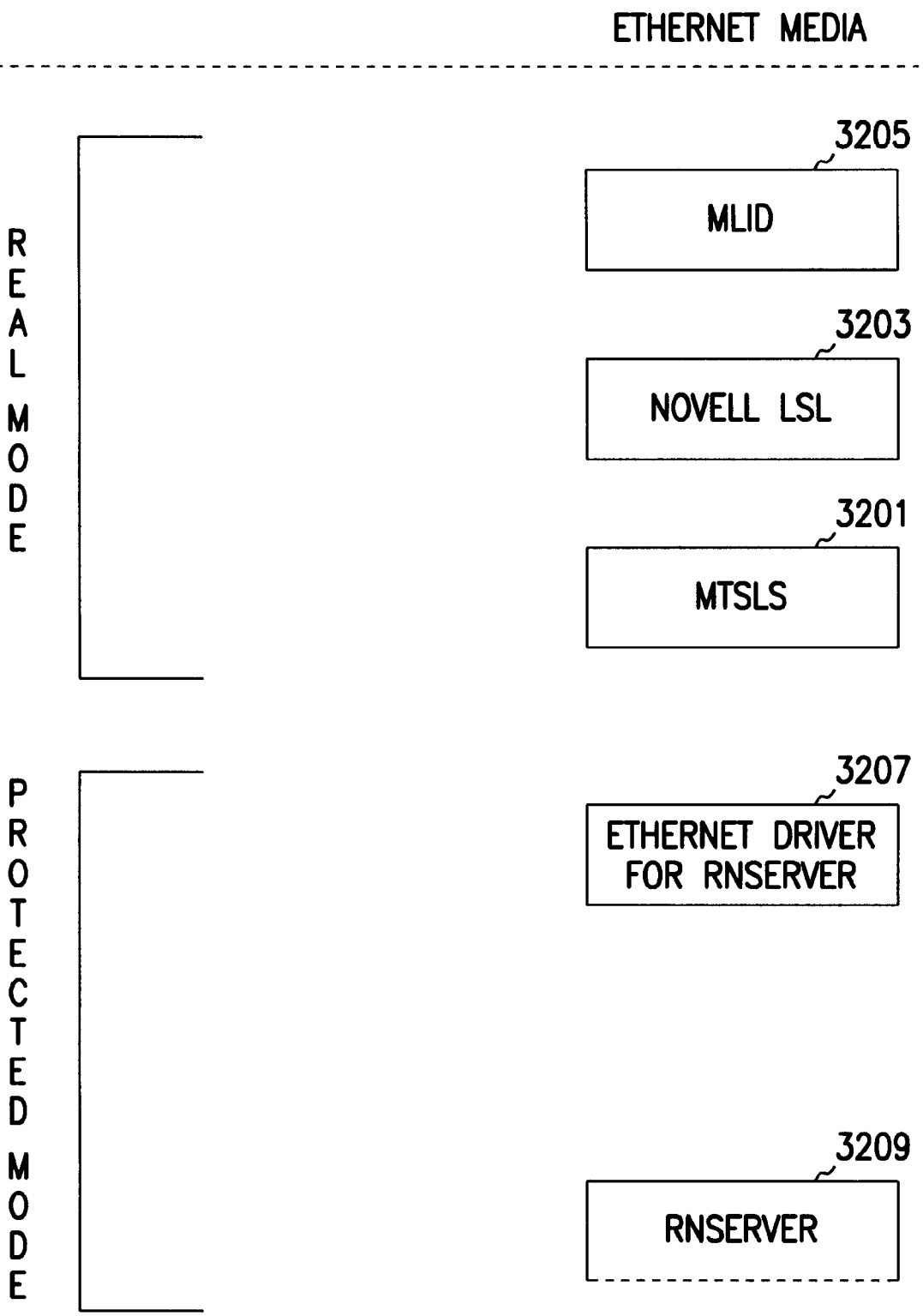
FIG. 19 is a logical block diagram showing protection modes for a portion of the program modules shown in FIG. 16.

FIGS. 2A and 2B show a system 100 containing four segments 105 with each segment 105 configured to support a T1 connection. One slot in each segment contains a RAS card 207 and the remaining three slots are populated with application cards 209. In the embodiment shown in FIGS. 2A and 2B, the RAS card 207 resides in the first slot, but the underlying bus architecture (see FIGS. 19 and 20 and the related discussion below) is common across all four slots and does not limit the cards to a single arrangement. As can be seen in FIG. 2B, the RAS card 207 provides six connectors. The COM (serial port) 261, VGA (video monitor) 263 and KBD (keyboard) 265 connectors correspond to like connectors that are standard on a personal computer. These three connectors are used to configure the microprocessor 901 (shown in FIG. 9) that controls the RAS card 207. The ALA connector 267 supports an alarm function which signals in case of a fault in a T1 card located in the connection segment. The T1 connector 269 couples the T1 line 107 to the segment 105 and the TST connector 271 is used by the T1 service provider (usually a phone company) for diagnostic and maintenance purposes. Alternate embodiments in which more than one T1 connector 269 is provided so that multiple T1 lines 107 can be supported by a segment 105 will be apparent to those skilled in the art.

Figure 6:
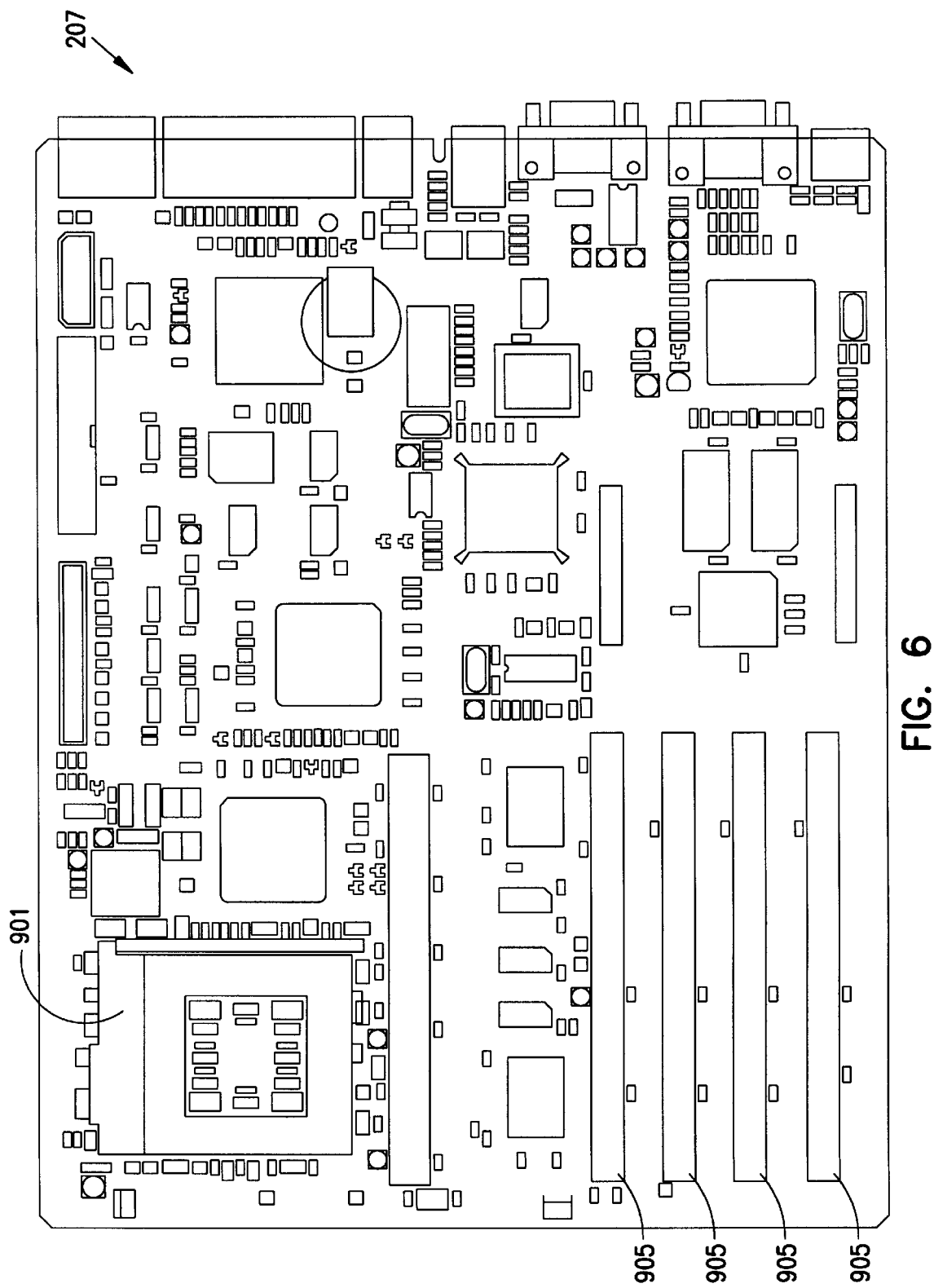
FIG. 6 is a block diagram representing one embodiment of a remote access server (RAS) card for the communications server system of FIG. 1A.

One embodiment of the RAS card 207 is shown in FIG. 6 and is designed to interface with the backplane of the system which provides data and control lines for the card. The RAS card 207 comprises a processor 901, such as an Intel Pentium®, a hard disk (coupled to a connector on the card), and four banks of RAM 905. The processor 901 executes remote server access software to process the data sent to and received from the application cards in the segment. Thus each segment 105 has a processor dedicated to processing the data traversing the application cards 109 in the segment. One embodiment of "native" remote access server application software is described in detail below in conjunction with FIG. 28, but the processor 901 is capable of executing remote access server software available from various sources including Microsoft Windows NT® and NetWare® Connect®.

Figure 22:
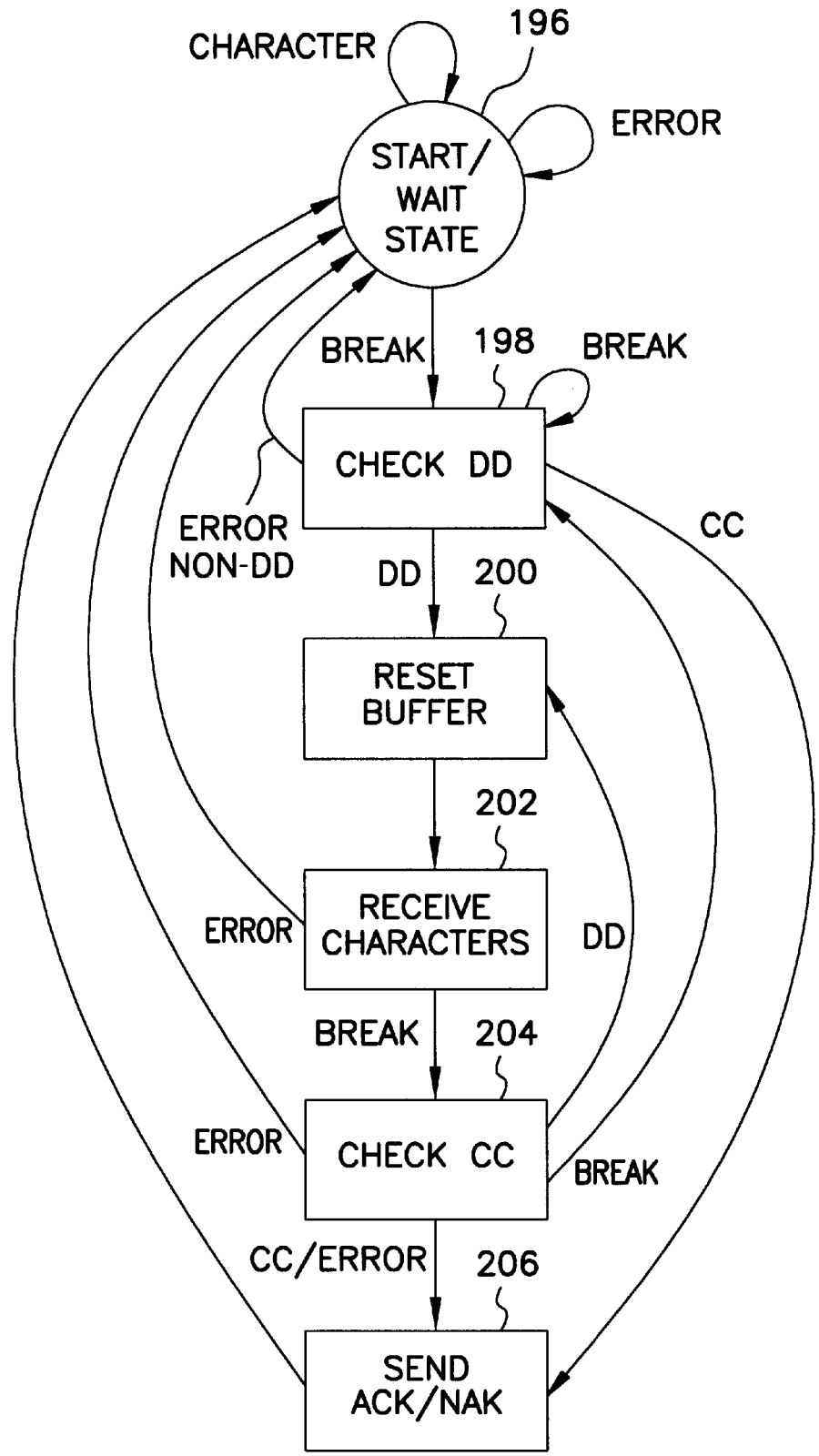
FIG. 22 is a state machine diagram for a bus protocol used by a portion of the backplane shown in FIG. 19.

In the embodiment shown in FIGS. 2A and 2B, each connection segment is configured with a T1 module 117 which is a T1 daughter card coupled to the RAS card 207. Alternate embodiments in which the components of the RAS card 207 and the T1 card are located on the same card are contemplated as within the scope of the invention. The T1 card comprises a processor/controller 1101, such as a Zilog 80182, which executes a firmware program described in detail below in conjunction with FIG. 22.

The application cards 209 in a segment can be modem cards, a PRI card, a PRI card with two modem cards, three BRI cards, or cards that are designed to support other types of communication connections.

Figure 8:
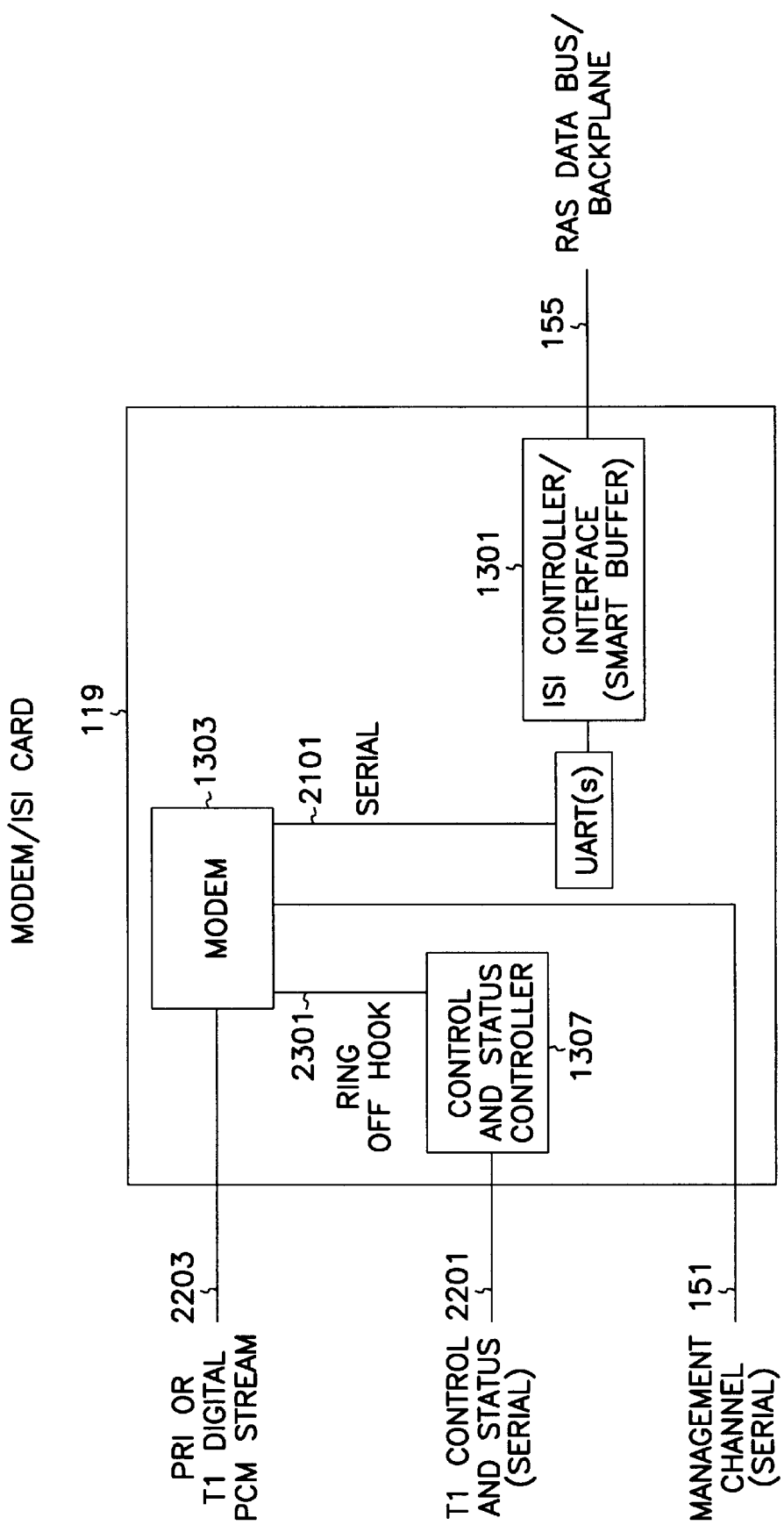
FIG. 8 is a block diagram representing one embodiment of a modem card with multiple modems for the communications server system of FIG. 1A.
Figure 9:
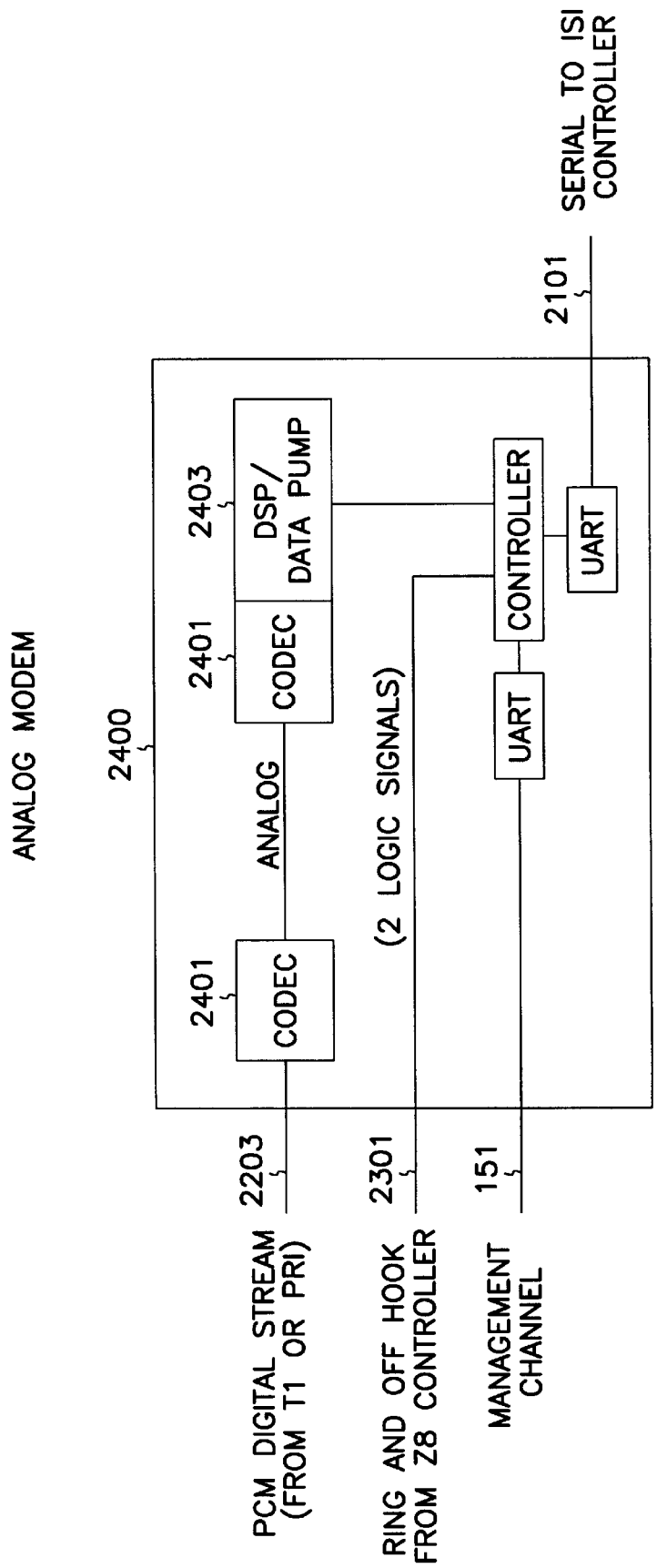
FIG. 9 is a block diagram of an analog modem on one embodiment of the modem card in FIG. 8.
Figure 10:
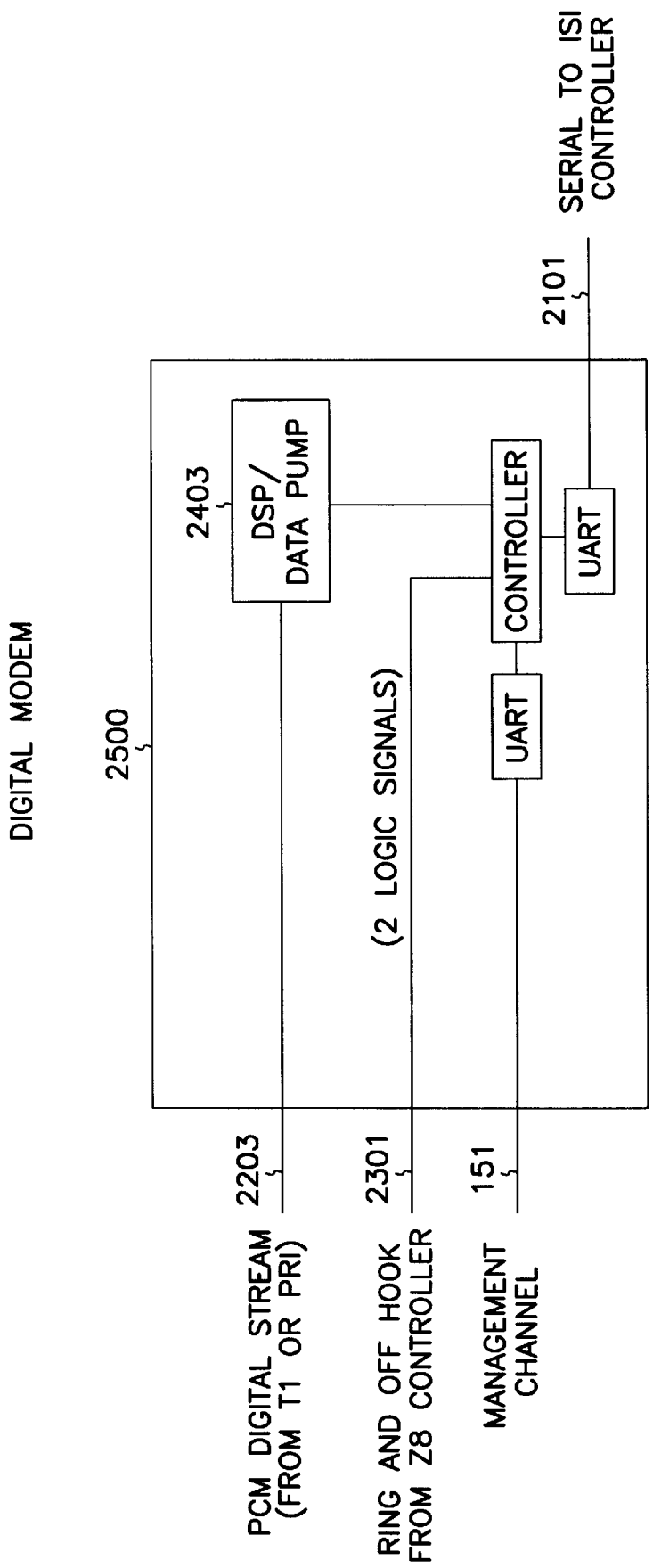
FIG. 10 is a block diagram of a digital modem on one embodiment of the modem card in FIG. 8

FIG. 8 shows a modem card (equivalent to modem module 119) for the communications server system 100 of FIGS. 2A and 2B which contains the components for multiple modems. The modems can be analog modems that translate and modulate/demodulate between digital and analog data streams (as shown in FIG. 9) or can be digital modems (as shown in FIG. 10) that perform only modulation and demodulation of digital data streams and do not translate the digital data to and from analog. The components of both types of modems are well known standard within the communications industry and are not described further as they are familiar to those skilled in the art.

Each modem card 119 shown in the above referenced figures contains a controller 1301, such as an Intel 80C186, which handles the interrupts from the modems 1303 and buffers the data streams from the modems prior to passing the data streams to the RAS card 207. In the present embodiment, the controller 1301 is called the ISI (intelligent serial interface) controller. Furthermore, each modem card 119 contains a control and status controller 1307, such as a Zilog Z86C30/31, which handles the T1 control and status signals. The data flow through the modem card controllers is described in detail below.

Backplane

Figure 11:
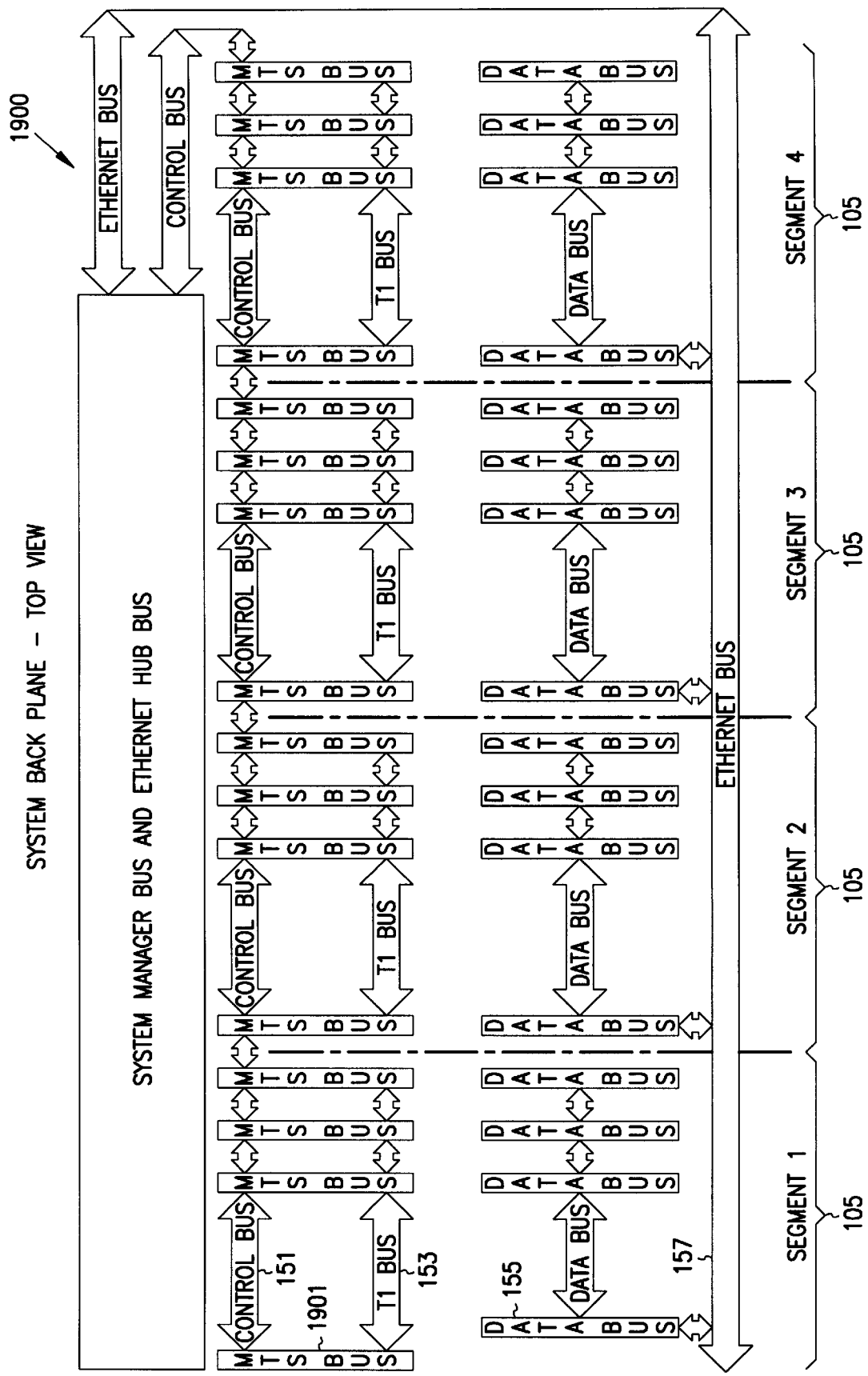
FIG. 11 is a block diagram representing one embodiment of a backplane for the communications server system of FIG. 1A.

A block diagram of the logical layout of a backplane 1900 for the embodiment of the communications server system 100 of FIGS. 2A and 2B is shown in FIG. 11. An MTS bus 1901 on the backplane 1900 communicates system management control signals among the components of the system using a proprietary protocol disclosed in U.S. Pat. No. 5,450,245 (described below). The system management control signals are transported between the segments and the system manager on 57,600 bits per second serial lines 151 on the MTS bus 1901. These management control bus lines 151 are collectively shown as arrows marked "control bus" in FIG. 11.

The arrows marked "T1 bus" in FIG. 11 represent bus lines 153 that transfer T1/ISDN data and control signals between the T1 card 211 and the modem cards 119 in each connection segment. The T1 control data lines comprise a 9600 bits per second asynchronous serial channel that uses the same proprietary protocol referenced above. The use of other bus protocols for the bus 153, including those such as the multi-vendor integration protocol (MVIP) which provide more than twenty-four time slots, will be apparent to those skilled in the art.

Figure 12:
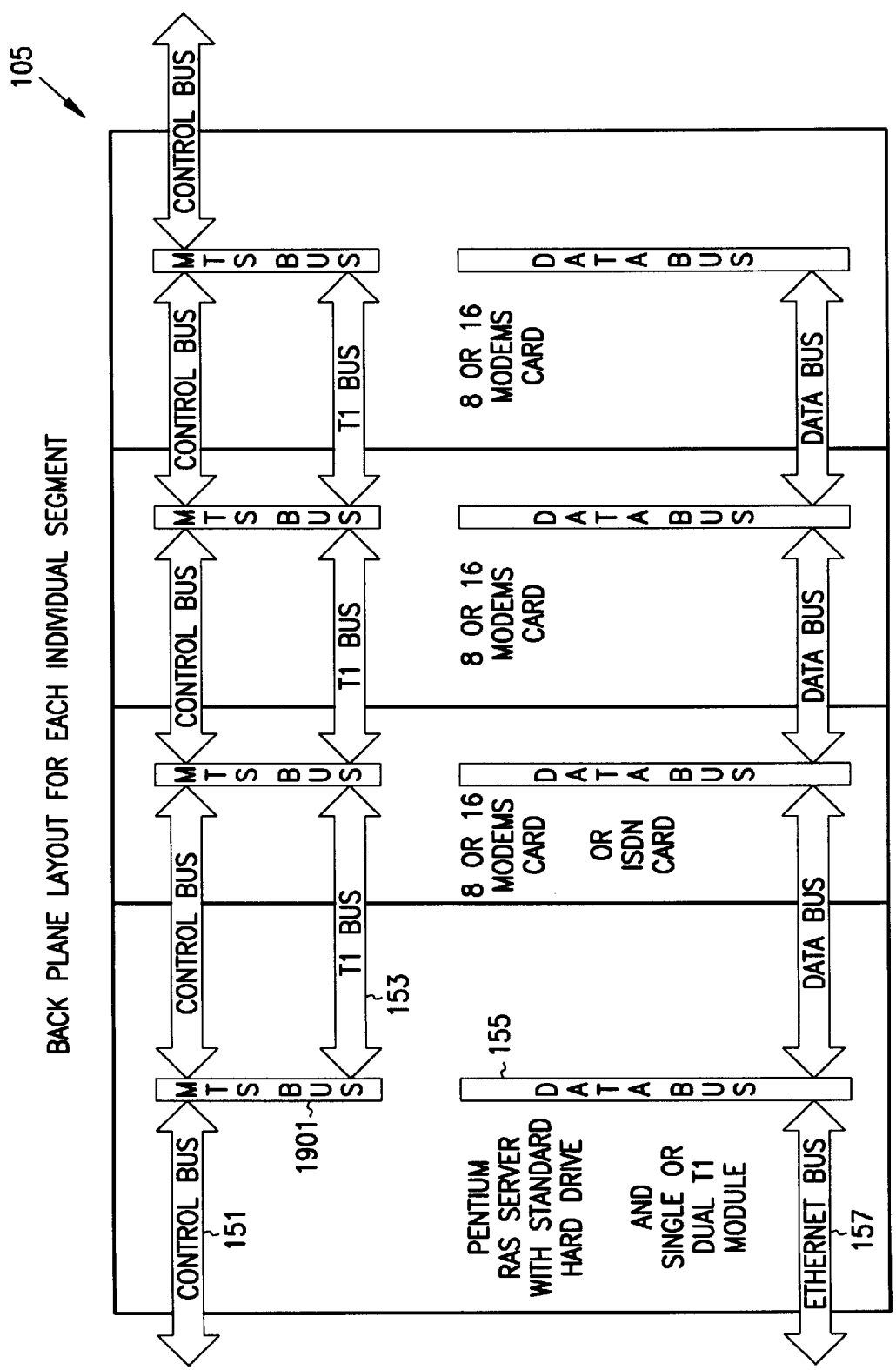
FIG. 12 is a block diagram showing the details of the backplane of FIG. 11 in each connection segment.

The data bus 155 on the backplane 1900 transfers data signals between the RAS card 207 and the modem cards 119 and also transfers data signals to an Ethernet bus 157 after processing by the RAS processor 901 (FIG. 6). The data bus 155 in the present embodiment is a proprietary parallel sixteen-bit data bus operating at 8 megahertz. FIG. 12 is a detailed block diagram showing the relationship of the buses in each individual segment.

Data Flow

Figure 13:
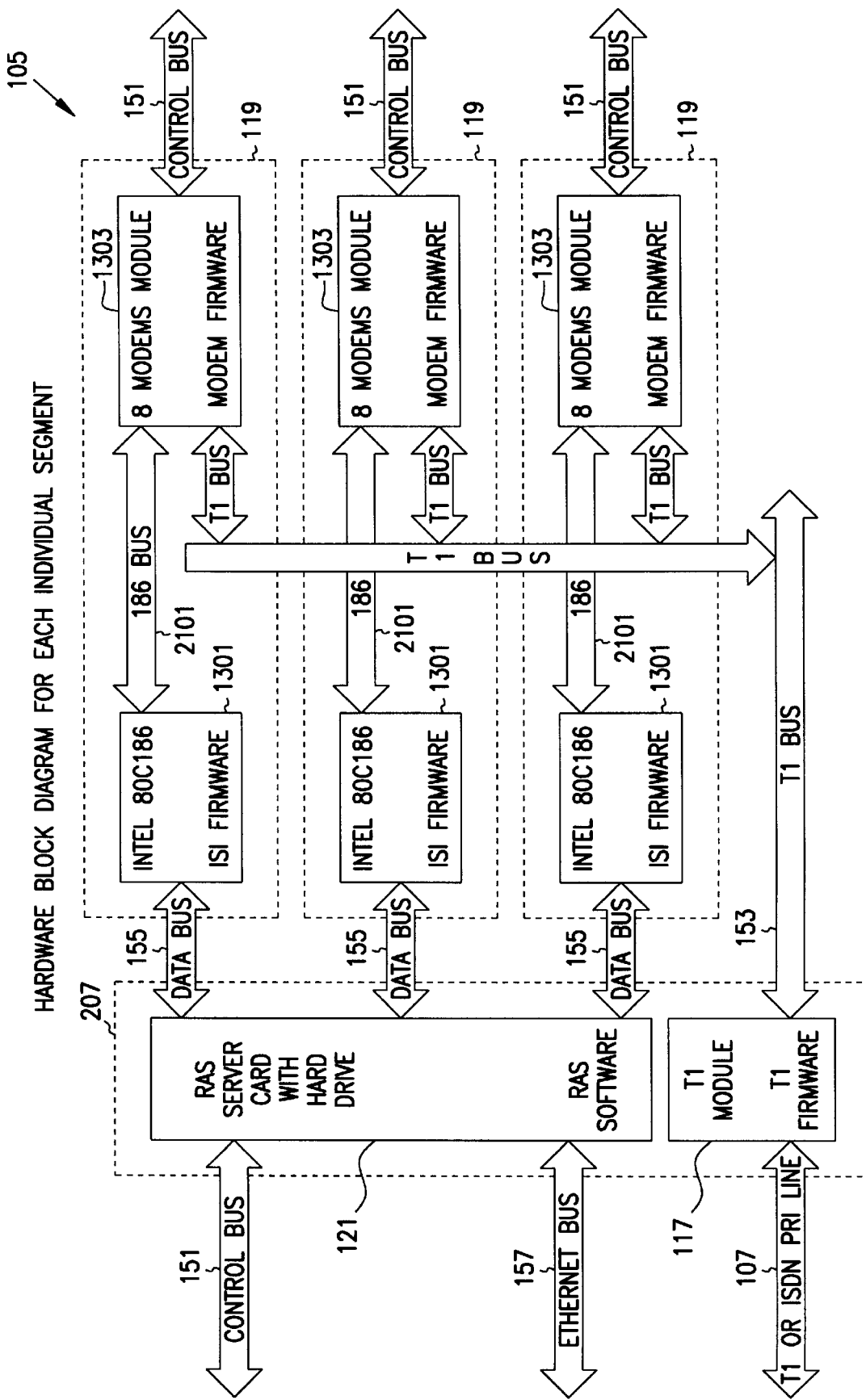
FIG. 13 is a logical block diagram showing the data and control flow among the components of a connection segment in the communications server system of FIG. 1A.

The following steps describe the flow of data signals coming into the system 100 from a T1 line 107, through the modems on the modem card 119 and out onto the Ethernet, and is illustrated at its highest level by the block diagram of FIG. 13. While the data flow is described in terms of T1 input, the substitution of any input source that provides a digital data stream will be apparent to those skilled in the art. In this example, the modules described in conjunction with FIGS. 1A–1D and 23 correspond to the cards described in FIGS. 2A and 2B, and both terms are used to refer to the same component in the descriptions that follow.

The external T1 line 107 is connected to the T1 controller 1101 on the T1 daughter card as shown in FIG. 7. The T1 controller 1101 and each modem card 119 are coupled through a T1 data bus 2201 and a T1 control bus 2203, collectively making up the bus 153 located on the backplane 1900 as described above. The T1 data bus 2201 transfers PCM data signals and the T1 control bus 2203 handles "ring" and "off hook" event signals. When a user is dialing into the communications server system, the T1 controller 1101 transforms the T1 input line signal into a PCM data stream at a different logic level, recovers the clock signal and sync bit, and decodes the signaling bits embedded in the PCM stream that indicate a ring for a specific modem 1303. The T1 controller 1101 generates and sends a packet on the T1 control bus 2201 to the appropriate modem card 119, as shown in FIG. 8, to inform the control and status controller 1307 that it should assert the ring line for the given modem 1303. The control and status controller responds to the signal by toggling the modem ring signal until the modem 1303 asserts its off hook line. After the modem 1303 asserts its off hook line, the control and status controller 1307 records this information and transmits it when the T1 controller next polls the control and status controller 1307 for information.

When the T1 controller 1101 receives the information that the modem 1303 is off hook and ready to receive data, the T1 controller 1101 notifies the central telephone office of the off hook event. At this point the data connection is established. As data is received from the T1 line 107, the T1 controller 1101 transforms the PCM data stream as explained above and places the data on the T1 bus 153 on the backplane 1900.

The PCM stream and clocks are decoded on the modem cards 119. Each of the modems 1303 gets it's own time slot (eight bits) of transmit and receive data. This data is shifted into a COderDECoder 2401 to be converted to an analog signal if the modem is an analog modem 2400 as shown in FIG. 9. The modem 2400 then re-samples this signal and demodulates it using a standard modem modulation such as V.34. If the modems 1303 are digital only modems 2500 as shown in FIG. 10, the analog translation is not necessary and the PCM digital data is shifted directly into a DSP (digital signal processor) 2403 where it is demodulated.

From the DSP 2403, the demodulated digital data stream is decoded into characters of eight-bit characters in accordance with communication industry standard protocols. The characters are then processed using standard link layer and compression protocols such as V.42, V.42bis, or MNP (Microm networking protocol).

Figure 21:
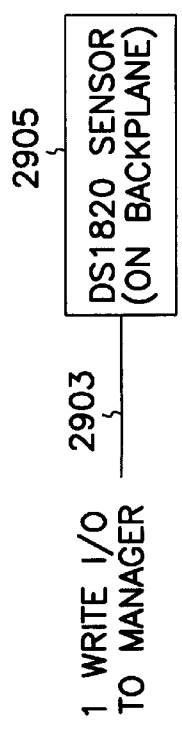
FIG. 21 is a block diagram of a temperature sensor for the communications server system shown in FIG. 2A.
Figure 14:
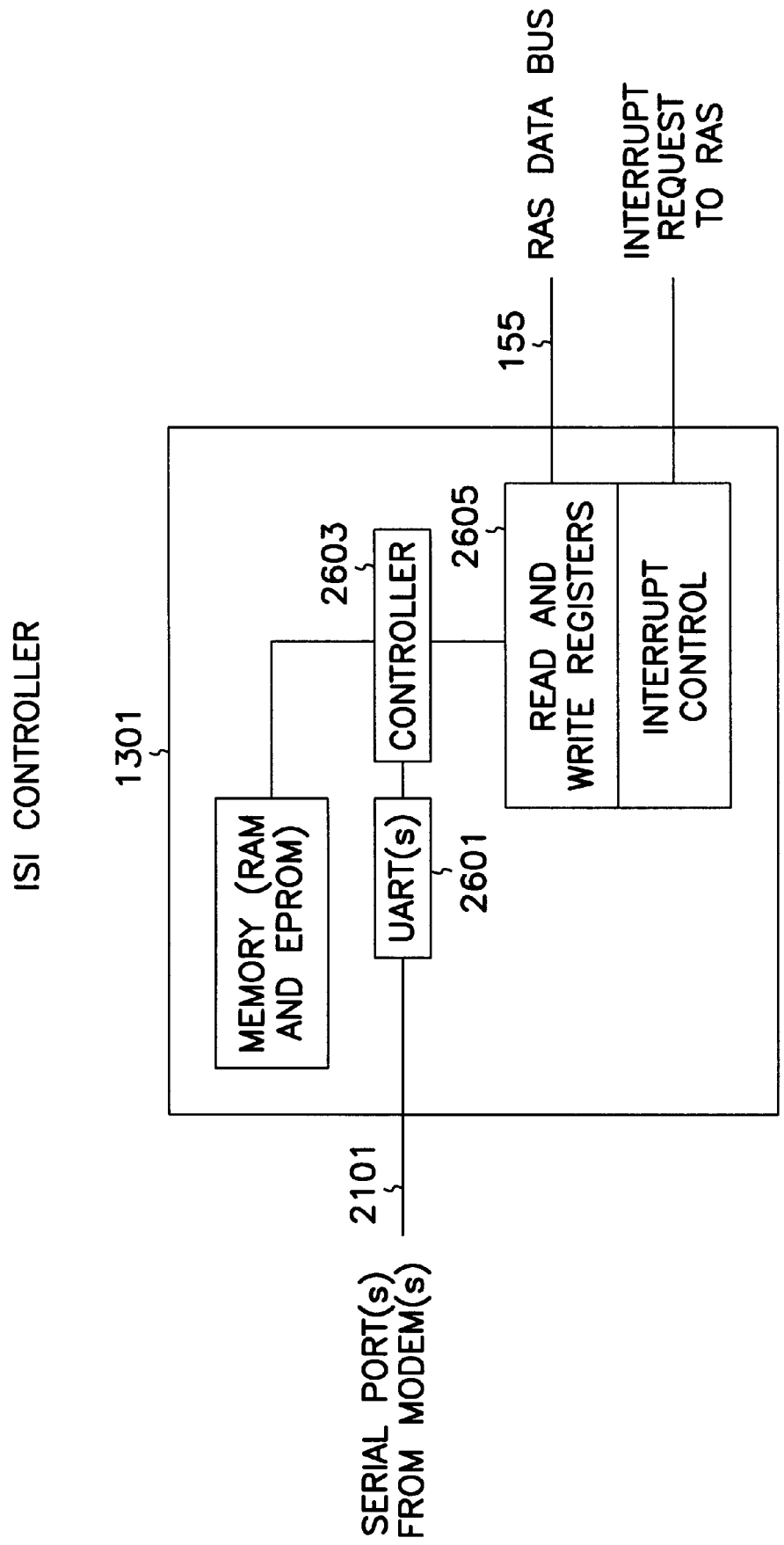
FIG. 14 is a logical block diagram showing the data and control flow among the components of an intelligent serial interface (ISI) controller on the modem card shown in FIG. 8.

The processed characters are transferred to the ISI controller 1301 from the modem 1300 using a bus 2101 marked "186 bus" in FIG. 21. A block diagram of the ISI controller 1301 is shown in FIG. 14. In the present embodiment, the processed characters are sent as serial data to a UART (universal asynchronous receiver and transmitter) 2601. Each modem is coupled to a specific UART 2601 in the ISI controller 1301. The UARTs 2601 are in turn coupled to the microprocessor 2603 portion of the ISI controller 1301. The microprocessor 2603 creates frames of data from the characters and places the frames in register files 2605 in the ISI controller 1301. The register files 2605 act as buffers for the RAS card 207 which can send or receive data to the ISI controller 1301 through the registers 2605. The RAS card 207 and the ISI controller 1301 communicate using a sixteen-bit packet protocol described below in conjunction with FIG. 17.

The RAS card 207 takes the data frames from the register file 2605 and performs higher level protocol manipulation on the frames as instructed by the RAS software described below in conjunction with FIG. 16. The RAS 207 then directs the resulting data packets to the Ethernet hub 101 via the Ethernet bus 157.

Figure 15:
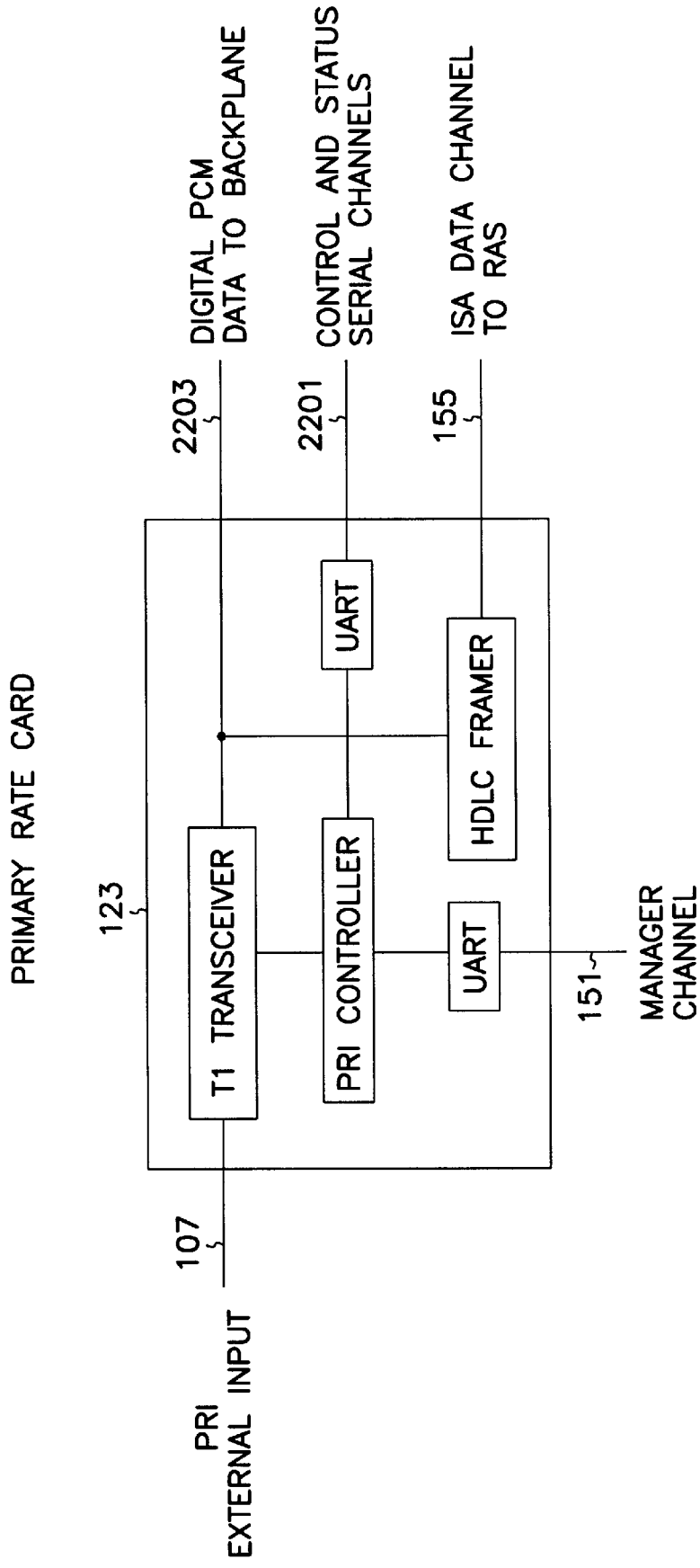
FIG. 15 is a logical block diagram showing the data and control flow among the components of one embodiment of a PRI card designed for the communications segment shown in FIG. 1C.

FIG. 15 shows an embodiment of a PRI card 123 that routes incoming PRI line data to the RAS card 207 for further processing. The PRI card 123 exchanges control/status information with the remote user through the D channel to setup the connection. Once the connection is established and assigned to a specific B channel, the PRI card 123 extracts the data from the appropriate B channel and sends it to the RAS card 207. The processing of the data by the RAS card 207 is as described above in conjunction with T1 data. In the alternate embodiment described above in which a B channel carries a modulated signal, the PRI card 123 sends the modulated signal to a modem assigned to the B channel. Processing of the modem signal proceeds as described above in conjunction with the T1 data.

Figure 24:
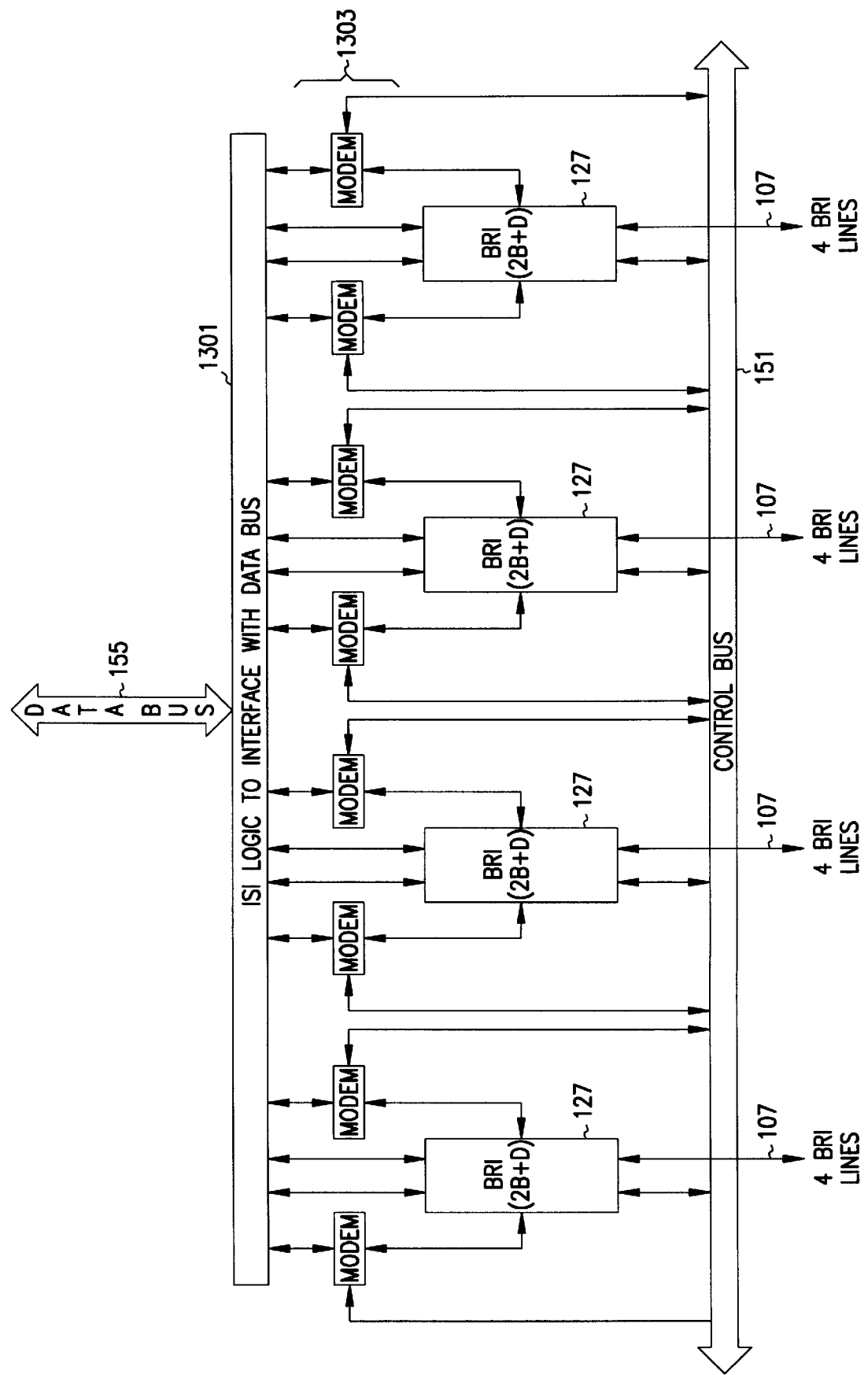
FIG. 24 is a block diagram of a BRI card designed for the communications segment shown in FIG. 23.

FIG. 24 shows an embodiment of a BRI module 125 comprising four BRI communication line interfaces 127 and eight modems 1303. Each BRI communication line interface 125 exchanges control/status information with the remote user through the D channel to setup the connection. Once the connection is established, the BRI communication line interface 127 extracts modulated data from a B channel and sends it to a modem assigned to the B channel.

RAS Software

Figure 16:
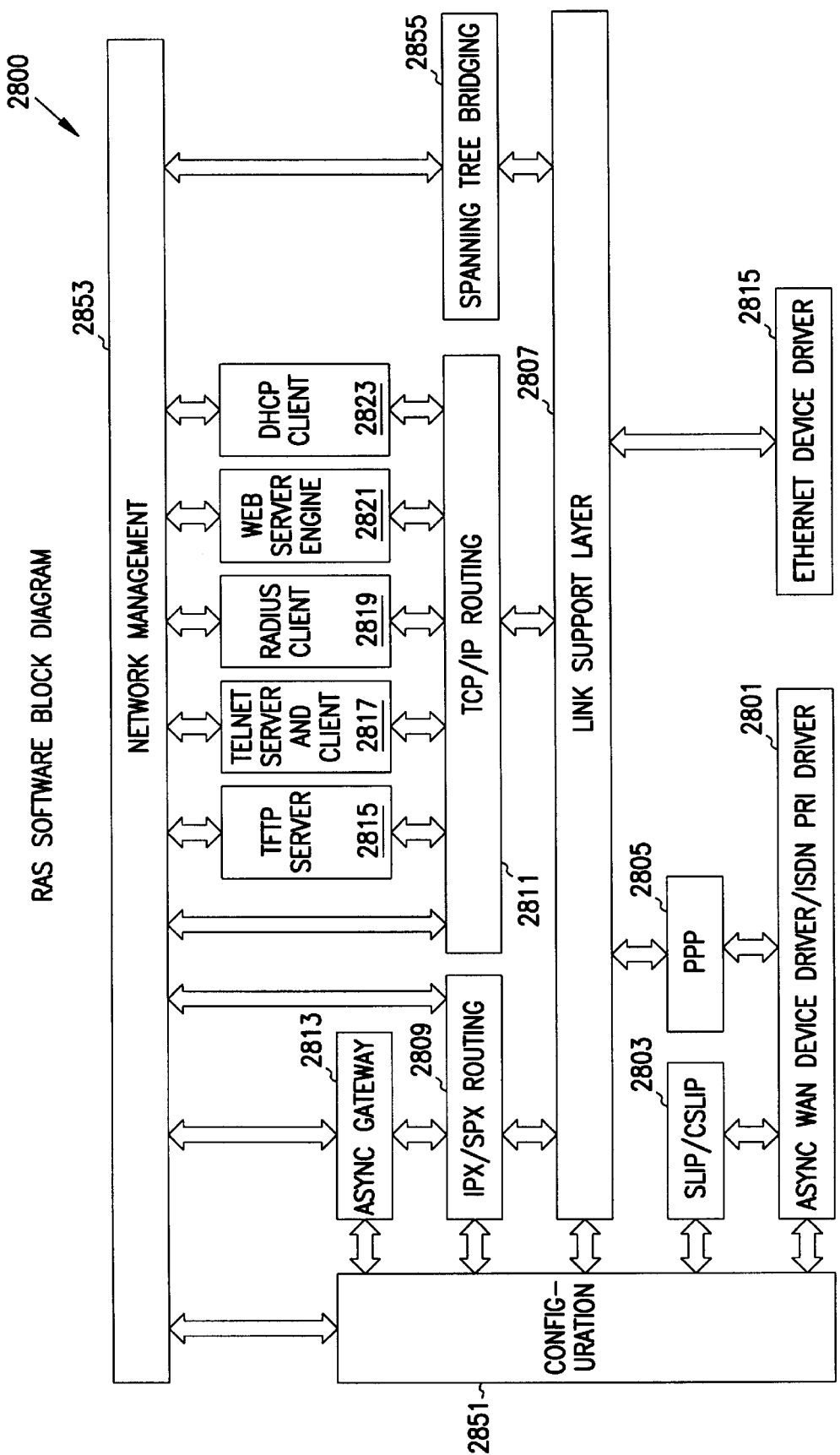
FIG. 16 is a logical block diagram of program modules comprising one embodiment of a remote access server (RAS) application software executing in a microprocessor on the RAS card of FIG. 6.

The RAS application software 2800 is made up of the modules shown in FIG. 16 and works with industry-standard protocols to process and route the data. Data packets from a modem 119 (or PRI 123) card are first processed through a device driver 2801 which determines whether the data is formatted as a SLIP/CSLIP (serial line interface protocol) or PPP (point-to-point protocol) packet. The packet is passed to the appropriate module (SLIP/CSLIP 2803 or PPP 2805) which strips control information specific to the protocol and passes the resulting data packet to the link support layer 2807. The link support layer 2807 determines the destination address of the data and then strips control information specific to the link layer 2807 before passing the resulting data packet to the next level in the protocol stack.

If the data is destined for a device on a LAN (such as Novell NetWare®) that is connected to the communications server system, the LAN routing module (illustrated by the IPX/SPX routing block 2809 in FIG. 16) re-packetizes the data to conform to the packet format for the LAN, and sends it out to the asynchronous gateway 2813 connected to the communications server system 100 through the LAN port 255.

If the data is destined for a device on an Ethernet network, a TCP/IP routing module 2811 re-packetizes the data to conform to the packet format for the Ethernet network and sends it to the Ethernet device driver module 2815 for transmission through the Ethernet port 255.

The data packet can be addressed to a service application executing in the microprocessor controller 901 on the RAS card 207. In this case, the data packet is directed to the TCP/IP routing module 2811 which strips the TCP/IP control information from the packet and passes the resulting data packet to the appropriate service. Examples of services provided by the RAS software 2800 are shown in FIG. 16.

The Radius 2819 and DHCP 2823 client modules are called during the user logon process. The Radius client 2819 verifies the user's logon sequence by accessing an authentication server that resides on the local Ethernet network. The DHCP (Dynamic Host Configuration Protocol) client 2823 via a DHCP server (not shown) dynamically allocates a temporary Ethernet network addresses to the user. The interface between the DHCP client and server is described below. The TFTP server module 2815 provides trivial file transfer protocol to a user while the Telnet server and client modules 2817 provides remote login and virtual terminal capabilities to the user.

The following sections describe the packet protocol used by the RAS microprocessor 901 and the ISI controller 1301 for communications, the functions of the DHCP module 2823, a modem support layer portion of the asynchronous device driver 2801, a MTSLSL (Multi-Tech Systems link support layer) portion of the link support layer 2807, portions of the TCP/IP routing module 2811, and the Telnet server module 2817.

ISI-RAS Communication

This documents details the procedure to communicate with the ports on ISI608 1301. All the I/O transfers between the ISI608 1301 and PC (processor 901) are word transfers. ISI608 1301 occupies 16 byte I/O address space on the PC bus 155.

| Word Address | Purpose |
|---|---|
| (ISI_BASE+0, ISI_BASE+1) | Data transfer |
| (ISI_BASE+2, ISI_BASE+3) | Status Indication |
| (ISI_BASE+4, ISI_BASE+5) | In - Low byte provides the DCD Signal Bitmap for the ports High byte provides the CTS Signal Bitmap for the 8 ports Out - Not used |
| (ISI_BASE+6, ISI_BASE+7) | In:- Low byte provides the RI Signal Bitmap (indicates whether RI is low or high) High byte provides DSR Signal Bitmap Out:- Not used. |

Bitmap is formed by setting or resetting the corresponding mask for each channel. For eg if inport(base+4)=0x302 (Channel numbers are zero-based)

that means the DCD for channel 1 is high, and CTS for channels 0 and 1 are high.

if inport(base+6)=0x9311 that means the RI for channels 0 and 4 is high (this does not indicate any transitions in RI signal)

and DSR for channels 0,1,4,7 is high.

| (ISI_BASE+A, ISI_BASF+B) | In - Clears the interrupt from the ISI608 |
|---|---|
| (ISI_BASE+C, ISI_BASE+D) | Out - Interrupts the ISI608 |
| (ISI_BASE+E, ISI_BASE+F) | In - Bit 0 indicates whether ISI608 is busy or not. |

The word located at (ISI_BASE+2, ISI_BASE+3) is used by either side to indicate the data acceptability to the other side. This register is essentially a bitmap, one bit for each channel. We need only 8bits for 8 channels. The lower byte is used indicate this bitmap.

The higher byte is not used currently.

By setting the appropriate bit for a channel, PC 901 indicates to the ISI608 1301 that it can accept a maximum block size (254 bytes) data for a particular channel. For example, to tell ISI608 1301 that it can accept a 254 bytes for channels 0,3,7, the PC 901 would do outport(ISI_BASE+0x02, 10001010b);

The same method of communication is used by the ISI608 1301 to tell the PC 901 if it can accept data for a channel or not.

Figure 17:
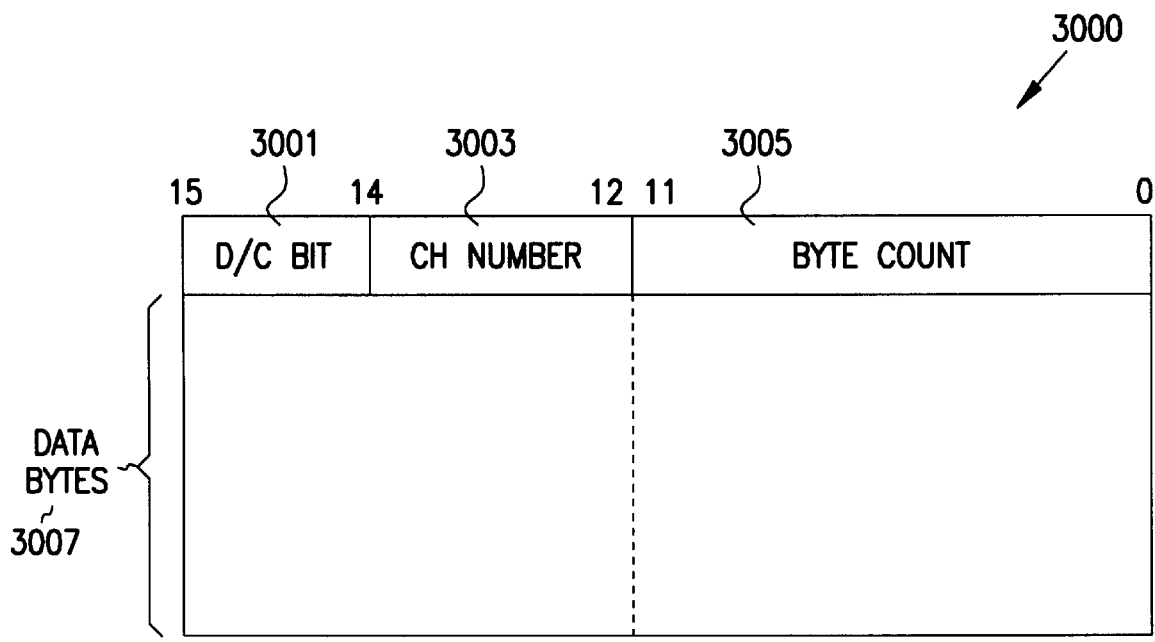
FIG. 17 is a data structure diagram of a communication packet exchanged between a controller on the RAS card and the ISI controller shown in FIG. 13.

Information is transferred from or to ISI608 1301 in the form of packets 3000 with a maximum packet size of 256 bytes. The structure of a packet 3000 is illustrated in FIG. 17, where D/C Bit 3001: Bit 15 which determines whether it is data packet or a command/status packet.

0—if data packet

1—if command packet

Ch Number 3003: Bits 12–14 indicate the channel number

Byte Count 3005: Bits 0–11 indicate the number of bytes in the packet 3000.

PC to ISI608 Communication:

PC to ISI608 packets are classified into two types depending on the D/C Bit 3001.

1) Data Packet

2) Command Packet

```
1) To send n bytes for channel 'p'
        while ((inword(base + 0x0E) & 0x01) == 0);
        while ((inword(base + 0x02) & (1 <<p)) == 0);
        outword(base, p << 12) | ByteCount);
        while (MoreData) ;; You can send upto 254 bytes
              outword(base, data);
        outword(base+0x0C, 0);
2) To send commands from the PC to the ISI608:-
        Command code is found at byte offset 2 of the command
    packet.
        a) Send Break on channel for the duration (Command Code
0):-
              while ((inword(base + 0x0E) & 0x01) == 0);
              outword(base, 0x8000 | (p << 12) | 3);
              outword(base, (BLL) << 8 | 0x0);<-- Command Code
```

-continued

```
            outword(base, (BLH));
                ;The duration is specified in the units
                ;of 10 milliseconds. BLL-Break
Length Low
                ;BLH- Break Length High
        outword(base+0x0C, 0);
    b) Start Break on Channel p (Command Code 1):-
        while ((inword(base +0x0E) & 0x01) == 0);
        outword(base, 0x8000 | (p << 12) | 1);
        outword(base, 0x01);
        outword(base+0x0C, 0);
    c) Stop Break on Channel p (Command Code 2):-
        while ((inword(base +0x0E) & 0x01) == 0);
        outword(base, 0x8000 | (p << 12) | 1;
        outword(base, 0x02);
        outword(base+0x0C, 0);
    d) Configure port for channel p (Command Code 3):-
        while ((inword(base +0x0E) & 0x01) == 0);
        outword(base, 0x8000 | (p << 12) | 0x03);
        outword(base, ((Baud_index) << 8) | 0x03);
        outword(base, (Channel_Setup));
        outword(base+0x0C, 0);
        where Baud_index is
            Baud_50    –0
            BAUD_75    –1
            BAUD_110   –2
            BAUD_134.5 –3
            BAUD_150   –4
            BAUD_200   –5
            BAUD_300   –6
            BAUD_600   –7
            BAUD_1200  –8
            BAUD_1800  –9
            BAUD_2000  –10
            BAUD_2400  –11
            BAUD_3600  –12
            BAUD_4800  –13
            BAUD_7200  –14
            BAUD_9600  –15
            BAUD_19200 –16
            BAUD_38400 –17
            BAUD_57.6K –18
            BAUD_115.2K –19
        Channel Setup
            Bits 0–1 set the word length
                00–5
                01–6
                10–7
                11–8
            Bit 2 sets the number of stop bits
                0–1 Stop bit with word length
                    of 5,6,7,8
                1–1.5 Stop bit with word length 5
                2 Stop bits with word length 6,7,8
            Bit 3-4 indicate parity
                00 - no parity
                01 - Odd parity
                10 - not used
                11 - even parity
            Bit 5,6 and 7 should be 000
    e) Setting EIA signals (Command Code 4):-
        while ((inword(base +0x0E) & 0x01 == 0);
        outword(base, 0x8000 | (p << 12) | 2);
        outword(base, (Signals << 8) | 0x04);
        outword(base+0x0C, 0);
        where Signals is defined as
            Bit 0 -
                1 - Raise DTR
                0 - Drop DTR
            Bit 1 -
                1 - Raise RTS
                0 - Drop RTS
            Bit 2 -
                1 - Change DTR
                0 - Do not change DTR
            Bit 3 -
                1 - Change RTS
                0 - Do not change RTS
            Bits 4–7 should be zeros.
    f) Setting flow control (Command Code 5) : -
        while ((inword(base +0x0E) & 0x01) == 0);
        outword(base, 0x8000 | (p << 12) | 4);
        outword(base, (FlowCtrl << 8) | 0x05);
        outword(base, (XOFF_CHAR << 8) | XON_CHAR);
        outword(base+0x0C, 0);
        where FlowCtrl is defined as
            Bit 0 - 1 Initiate hardware flow control
            Bit 1 - 1 Respond to hardware flow control
            Bit 2 - 1 Initiate software flow control
            Bit 3 - 1 Respond to software flow control
        XOFF_CHAR, XON_CHAR :- These are 8 bit
        characters indicating the Xoff and Xon characters.
        You don't need to send these characters as long as you
        use hardware flow control. But make sure to send them
        whenever you set a port for software flow control.
    g) Kill Tx and Rx queues (Command Code 6):-
        while ((inword(base +0x0E) & 0x01) == 0);
        outword(base, 0x8000 | (p << 12) | 2);
        outword(base, (KillSel << 8) | 0x06);
        outword(base+0x0C, 0);
        Where KillSel is defined as
            Bit 0:- 1 - Kill Tx Queue
            Bit 1:- 1 - Kill Rx Queue
    h) To set signal mask (Command Code 7):-
        This command informs the ISI608 which signals the PC
        is interested in monitoring.
        while ((inword(base +0x0E) & 0x01) == 0);
        outword(base, 0x8000 (p << 12) | 2);
        outword(base, (SignalMask << 8) | 0x07);
        outword(base+0x0C, 0);
        where SignalMask is defined as
            Bit 0 - 1 Notify changes in CTS signal
            Bit 1 - 1 Notify changes in DSR signal
            Bit 2 - 1 Notify changes in RI signal
            Bit 3 - 1 Notify changes in DCD signal
    i) To clear error statistics (Command Code 8): -
        while ((inword(base +0x0E) & 0x01) == 0);
        outword(base, 0x8000 (p << 12) | 2);
        outword(base, 0x08);
        outword(base+0x0C, 0);
        This command simply resets the Overrun, Parity and
        Framing errors to zero.
    j) To get port statistics (Command Code 9):-
        while ((inword(base +0x0E) & 0x01) == 1);
        outword(base, 0x8000 | (p << 12) | 1);
        outword(base, 0x09);
        outword(base+0x0C, 0);
ISI608 To PC Communication:-
```

ISI608 1301 communicates with the PC 901 by means of an interrupt. Data packets from the ISI608 to PC have the same format described above with reference to FIG. 17.

```
1) Reading data packet:-
    inword(ISI_BASE);      /* Just read a dummy byte */
    Packet_Header = inword(ISI_BASE);
    channel_number = (Packet_Header & 0x7fff) << 12);
    byte_count = (Packet_Header) & 0xfff;
    if(Packet_Header & 0x8000) {
        /* This is a status packet.
           Possible status packets and their codes are described
           below. byte_count indicates the bytes in the command
           packet including the command code byte. */
        while (byte_count > 0) {
            StatusWord = inword(ISI_BASE);
            store status word;
            byte_count = byte_count – 2;
        }
    }
    else{ /* This is data packet */
        While (byte_count > 0) {
            data = inword(ISI_BASE)
```

-continued

```
        store data;
        byte_count = byte_count - 2;
      }
  }
  Update (ISI_BASE+2 ISI_BASE+3) register to indicate the
    PC data acceptability bitmap.
  inword(ISI_BASE+0x0A); /* This clears interrupt from ISI608 */
D/C Bit 3001 if set for status packets from the ISI608 1301 to the PC
901.
In the case of status packets byte offset 2 in the packet contains the code;
  If byte offset 2 is
    0 :- Some EIA Signals haye changed state for the channel.
      The next byte contains the current signal status. It
      is upto the PC to find out which signals have changed
      state.
        Bit 7 : - DCD
        Bit 6 : - RI Toggled
        Bit 5 : - DSR
        Bit 4 : - CTS
        Bits 0–3 unused.
        (byte_count for this packet is 02h)
    1 :-
      Break condition has been detected on this channel.
      (byte_count for this packet is 01h)
    2 :-
      This packet contains statistics for the channel.
      Byte offset 3 will contain a dummy byte to align
      the data to word boundary. The statistics for the
      channel start from Byte offset 4 and are stored
      in the following structure.
        TxQ Count   Word
        RxQ Count   Word
        Overrun Errs Word
        Framing Errs Word
        Parity Errs Word
        Signal Status byte
        Signal Status bits are as defined above
        in status command 0.
      (byte_count for this packet is 0Dh)
```

Note:- It is important to read a dummy word from ISI_BASE before you can read a packet from the ISI608.

DHCP Support for Multicom Remotenode Gateway
Introduction:

DHCP stands for "Dynamic Host Configuration Protocol". DHCP's purpose is to enable individual computers on an IP network to extract their configurations from a server (the 'DHCP server') or servers. The overall purpose of this is to reduce the work necessary to administer a large IP network.

DHCP is based on BOOTP and maintains some backward compatibility. The main difference is that BOOTP was designed for manual pre-configuration of the host information in a server database, while DHCP allows for dynamic allocation of network addresses and configurations to newly attached hosts.

Purpose for Integration:

DHCP supports "dynamic allocation" of IP addresses.

In dynamic allocation, DHCP assigns an IP address to a host for a limited period of time (or until the host explicitly relinquishes the address). This mechanism allows automatic reuse of an address that is no longer needed by the host to which it was assigned. This becomes useful for sharing a limited pool of IP addresses among a group of hosts.

* RN Server 2823 shown in FIG. 16 can support up to 32 clients connected into it simultaneously. Presently each client is given an IP address statically. So, even if a connection has gone down on some line or if some connections have not come up at all, the IP addresses assigned over those lines go waste, in that, they cannot be utilized for any other assignments. By providing DHCP support for RN Server, it is possible to overcome this problem. DHCP Support Process:

A powerful DHCP Client Software is enabled at the RN Server end. In our case, RN Server should take care of assigning IP addresses to the remote PPP client and also the necessary management operations. Thus RN Server does DHCP by proxy for remote client.

** DHCP Server identifies a potential client by its MAC address.

In our case, RN Server does proxy for remote clients using a set of pseudo-MAC addresses for the purposes of communications with the DHCP Server.

** As soon as a client tries to log in to RN Server before the PPP negotiations take place over the WAN port, RN Server issues a DHCPDISCOVER limited broadcast, requesting for an IP address. (This is possible by an option field in the DHCP message format). The DHCP Server responds with a DHCPOFFER. RN Server can get more than one such offers.

** RNServer chooses the first DHCPOFFER, and immediately puts forth a DHCPREQUEST, limited broadcast. The Server Identifier field is filled in, to identify a particular server. Also, we request an infinite lease.

** The DHCP Server may respond with either DHCPACK (if IP Address allowed) or a DHCPNAK (if IP Address is invalid or already allocated). If RNServer get a DHCPACK message, then it has got the IP Address. It configures the remote client with this IP Address. If RNServer gets a DHCPNAK message, then it immediately reissues a DHCPDISCOVER broadcast.

NOTE: Here we have to assume that the communication over LAN takes place at much higher speed than over WAN. Hence, before we assume that before PPP negotiations are complete we have to get the IP Address from the DHCP Server.

** In the absence of a DHCP Server, the usual negotiations take place and the IP Address is assigned statically.

NOTE: DHCP servers are not present if there is no response to the DHCPDISCOVER broadcasts from the RN Server. RN Server then times out allowing static configuration of IP Addresses. RN Server may reissue these broadcasts periodically, to check for any new DHCP Servers.

** RN Server must also, take care of the fact that, the lease of the IP Address doesn't expire, by sending periodic DHCPREQUEST's.

RNserver as a DHCP Relay Agent:

One more possibility is to have our RNServer as DHCP relay agent. In that, the DHCP Server is told, not to broadcast DHCPACK or NAK'S. The DHCP Server, directs the messages directly to RN Server. Then, RN Server should communicate the client of its IP Address.

* RN Server could act as a relay agent, since it has a well defined MAC address as well as an IP Address.

NOTE: The IP address of RN Server may also be obtained from the DHCP Server.

* Traffic is minimized in this approach, since the messages are directed.

Security Considerations:

** Unauthorized DHCP servers may be easily set up. Such servers can then send false and potentially disruptive information to clients such as incorrect or duplicate IP addresses, incorrect routing information (including spoof routers, etc.), incorrect domain nameserver addresses (such as spoof nameservers), and so on.

** Malicious DHCP clients could masquerade as legitimate clients and retrieve information intended for those legitimate clients.

NOTE: After getting an IP address, RN Server has to make sure that the address is unique, by sending a ARP Request over the LAN.

Modem Support Layer

Figure 18:
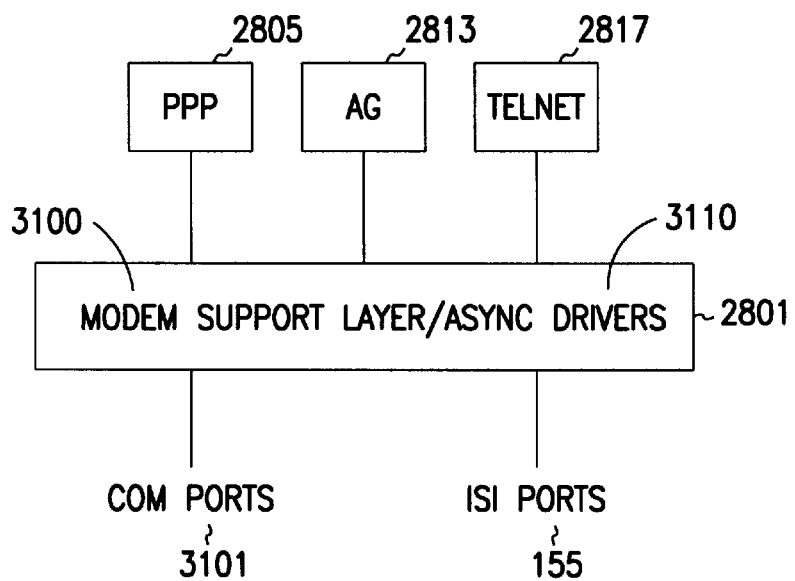
FIG. 18 is a logical block diagram detailing the connections among a subset of the program modules shown in FIG. 16.

The modem support layer 3100 is integrated into the async serial communication layer 2801. It provides a serial communication interface to the layers on top of it (PPP, AG and TELNET). The main job of the modem support layer 3100 is to handle all multiplexing and demultiplexing for PPP 2805, Asynchronous Gateway (AG) 2813, and TELNET lines 2817 (FIG. 18).

The modem support layer 3100 accepts whatever data PPP 2805, AG 2813 and TELNET 2817 gives for transmission and transmits them on the serial ports 3101, 155 and receive whatever data comes on the serial ports and pass it to the upper modules (PPP, AG, TELNET). It takes care of direct connect 3101 and modem lines 155. In case of modem lines 155 it takes care of all the modem handling (initializing modem, resetting modem, etc.).

This layer 3100 does not try to interpret the data it receives/transmits. The only place it tries to interpret data is when the port is free and a call comes in. Here it checks the data for a ppp delimiter (0×7E). If the first byte received is a PPP delimiter, MSL 3100 assigns the port to PPP 2805. If anything other than a PPP delimiter is received it assumes the data is for somebody waiting for a inbound call and assigns the port to AG 2813.

PPP 2805, AG 2813 and TELNET 2817 make calls to this layer 3100 to transmit and receive data on the serial port 3101, 155.

Data Structures

All the data structures used are declared in the vasncstr.h. The main data structure that is used is the

PORT
ASYNC_PORT_CLASS
ASYNC_CARD_CLASS
ASYNC_CLASS structures.

The PORT structure contains LineInformation and ModemInformation, and all port related informations which are currently used. An array of type PORT 'PortInfo' is defined for each port and initialized.

The ASYNC_PORT_CLASS structure contains all the configured parameters read during initialization. Each time a port is reset the parameters are copied into the PortInfo array for that corresponding port.

The ASYNC_CARD_CLASS stores the baseaddress and the irq of the ISI cards 155/corn ports 3101 used. The values are initialized once and never changed.

Initialization

The async driver 3110 and MSL 3100 initialization is done by call initialize_async_controller call.

This call is made when the server comes up.

This call captures interrupt vectors, loads the firmware for the ISI608 card 1301, registers the port with LSL 2807, initialize transmit and receive descriptors, allocate device driver buffers for PPP 2805 and AG 2813, configure the port and initializes the modem.

Transmit and Receive

Reception is interrupt driven for both COM 3101 and ISI608 155 ports.

Transmission is interrupt driven in the case of COM ports 3101 and for ISI608 ports 155 they are handled through timer functions.

Separate Interrupt handlers are there for ISI608 155 and COM 3101 ports.

PPP 2805 and AG 2813/TELNET 2817 use separate functions to send and receive data over serial lines.

PPP 2805 calls "send_async_packet" to send data, while AG 2813 and TELNET 2817 calls "AsyncWriteData" to send data.

PPP 2805 polls for data received using the function "async_packet_received" while AG 2813/TELNET 2817 uses the function AsyncReadDataAG to read data from line.

Functions Supported

Functions in ASYNCINI.C

| FUNCTION | initialize_async_controller |
|---|---|
| Parameters | Not used |
| Returns | TRUE on success. Else FALSE. |

This call is made when the server comes up. This call captures interrupt vectors, loads the firmware for the ISI608 card 1301, registers the ports with LSL 2807, and the functions to be called by PPP 2805 to send receive data, initialize transmit and receive descriptors for each port, allocate device driver buffers for PPP 2805 and AG 2813, initialize each port (by calling function "InitPort") and initializes the modem (done in InitPort).

| FUNCTION | initialize_async_tx |
|---|---|
| Parameters | port_number |
| Returns | |

This function initializes the transmit descriptors for the port, identified by the parameter port_number. The function also allocates the transmit and receive buffers used for AG 2813 and TELNET 2817 (This same buffer is used to initialize modem).

| FUNCTION | initialize_async_rx |
|---|---|
| Parameters | port_number |
| Returns | |

This function initializes the receive descriptors for the port, identified by the parameter port_number, and allocates buffer for the descriptor.

| FUNCTION | async_control |
|---|---|
| Parameters | command |
| | parameter_0 |
| | parameter_1 |
| Returns | PASS/FAIL |

PPP 2805 calls this function to open and close serial ports. The parameter command identifies the action to be taken. The parameters "parameter_0" and "parameter_1" is interpreted according the parameter command.

The different commands are

1. OPEN_SERIAL_PORT_FOR_CALLBACK
   PPP 2805 makes this call when the client has asked for call back
   parameter_0 contains the portnumber on which call back is requested.
   parameter_1 contains a pointer to the userinfo structure.
   The call back number and the callback delay is obtained from this userinfo.

-continued

These values are stored in the async driver 3110. After the timeout the async driver 3110 dials back. Once he sees the CD high he calls PPP 2805 with the UP event (the call is made through lsl_control function).

2. CLOSE_SERIAL_PORT
   PPP 2805 makes this call to close a serial port
   parameter_0 contains the portnumber to close.
   The connection will be dropped and the port will be reinitialized in a state machine. Before returning we make a call to PPP 2805 to inform the DOWN event. Care should be taken to avoid re-entrancy. Because PPP 2805 calls async driver 3110 with a close device driver on receiving a DOWN event. (In out case we keep a flag ConnectUp which
   is checked.)

3. OPEN_SERIAL_PORT_ON_DEMAND
   parameter_0 contains the portnumber.
   This call is support Dial on Demand. This call is made by PPP 2805 to open the serial port which was closed on demand. This call is made only when we have dial on demand enabled and our end dials and establishes the connection. The Phone number to dial is stored in async.

4. CLOSE_SERIAL_PORT_ON_DEMAND
   parameter_0 contains the portnumber.
   This call is support dial on demand. This is used to set a flag in the driver so that the driver doesn't start dialing immediately after the port is initialized. (Usualy the port will be initialized after a close. If the port
   is configured as dialing we immediately start dialing.)

5. CHECK_IF_ANSWERING
   This call is made by PPP 2805 to find out whether the port is a answering port or a dialing port. The value is returned in the location pointed by parameter_1.

| FUNCTION | InitPort |
|---|---|
| Parameters | port_number |
| Returns | PASS/FAIL |

The copies the configured parameters from the async.port [portnumber] to Portinfo [port_number]. async port [port_number] (structure of type ASYNC_PORT_CLASS) contains the configured values for the port related parameters. Each time the port is initialized the parameters are copied to the PortInfo [port_number] (array of structure PORT). The PortInfo array contains the current values of the port related parameters.

Then the COM port 3101 or the ISI port 155 as the case may be is reset.

If a modem is connected to the port the modem is initialized. This is done as a state machine, AsyncStateMachine. If no modems are connected the state machine moves to the state, waiting for call/running script etc., depending on what is configured on the port and what is current state.

| FUNCTION | ResetStatisticsForPort |
|---|---|
| Parameters | sptr_port |
| Returns | |

This functions resets the statistics maintained by the async driver 3110 for each port. sptr_port points to async.port [portnumber] where the portnumber denotes the port whose statistics is to be reset.

| FUNCTION | IntiRconCfgFile |
|---|---|
| Parameters | |
| Returns | 1 on success, 0 on file-io error. |

This function is called once when the server co_____.

| FUNCTION | async_packet_received |
|---|---|
| Parameters | port_number |
| | sptr_async_buffer_rxed |
| | usptr_number_of_bytes_rxed |
| Returns | TRUE if a packet is found. Else FALSE. | port_number: Port number to which to recv data.

PPP 2805 calls the async_packet_received function to check for any data received. If a ppp packet is received and queued up a pointer to the packet is returned in the sptr_async_buffer_rxed. The number of bytes in that packet is returned in the location pointed by usptr_number_of_bytes_rxed. If a data is found, after copying a pointer to the data buffer, the descriptor is removed from the receive queue. If available a new buffer is allocated. Else it is pou in a need buffer list.

| FUNCTION | async_delimiter_received |
|---|---|
| Parameters | port_number |
| Returns | |

This function is called from the COM interrupt handler for ppp ports to receive data. The receive can be in two states, 1. in the middle of a packet, 2. finished one packet.

In the first case the data is copied into the previous descriptor. In the second case, a new descriptor is allocated and the data is copied into that descriptor.

When we finish receiving one packet, we check the packet length for very small and very large packets. If we get a packet of good size we add it to the receive list.

| FUNCTION | async_return_buffer_to_device_driver |
|---|---|
| Parameters | real_port_number |
| | vptr_buffer |
| Returns | |

This function is a callback function passed to LSL 2807 when a port is registered during initialization. This function will be called from other modules when they finish processing a packet received, and wants to free the memory. It calls device_driver_free to free buffer.

If a descriptor is available for which no buffer is allocated, we try to allocate the buffer using the get_a_new_async_buffer call.

Functions in ASYNCTX.C

FUNCTION send_async_packet

| | |
|---|---|
| Parameters | port_number: the port_number on which to send data (starts from virtual_port_number: the port number used by the protocol stack to identify the port<br>sptr_tx_buffer: Pointer to the starting of data<br>number_of_bytes: no of bytes of data to be transmitted<br>do_not_calculate_new_crc: not used<br>device_driver_buffer: if set the buffer is a device driver buff<br>fptr_tx_completion: pointer to function to be called when the send is complete.<br>vptir_async_buffer: pointer to a structure which contains the buffer to send, used as a parameter when calling fptr_tx_completion. |
| Returns | TRUE on success. Else FALSE. |

This function is called by PPP 2805 to send a packet.

The function finds a free descriptor, and queues the packet for transmission.

If not able to find a descriptor, it turns on the TX_INT in case of a corn server, or calls the ISI's send routine. The actual data is send in the interrupt handler in case of COM 3101 and for ISI 155 is done in the timer.

| | |
|---|---|
| FUNCTION | async_packet_xmit_isr |
| Parameters | port_number |
| Returns | |

This function is called from the COM interrupt handler for ppp ports to send data. If there is any pending transmit, it is done now. Else we turn of the transmit interrupt in the uart and return. If a packet is completely sent, puts the descriptor in the transmit complete list. Later in the "async_packet_transmitted" function is called we free the buffer.

| | |
|---|---|
| FUNCTION | async_packet_xmit_ISI |
| Parameters | port_number |
| Returns | |

This function is called from the foreground for ppp ports to send data on ISI ports. If there is any pending transmit, it is done now. If a packet is completely sent, puts the descriptor in the transmit complete list. Later in the "async_packet_transmitted" function is called we free the buffer.

| | |
|---|---|
| FUNCTION | async_packet_transmitted |
| Parameters | port_number |
| Returns | |

This function checks for any receive descriptors which needs a buffer (i.e. no buffer is allocated in the descriptor) then we try to allocate a buffer. If there is a descriptor, where is we have finished with transmit, we free the buffer by calling either the application's free routine or device driver free routine depending on whether it is a application buffer or a device driver buffer.
Functions in mslasm.asm

| | |
|---|---|
| enum TEST | AsyncWriteData_ |
| Parameters | PortNumber: Port number to which to send data.<br>Count: The number of bytes to send. |

-continued

| | |
|---|---|
| Returns | Buffer: FAR pointer to buffer<br>The number of bytes actually send or buffered. |

This function is used by AG 2813 and TELNET 2817 to send data to serial port For an ISI server we try to send as much data as possible to the ISI 1301 (using the ISIWriteChars). We return the number of bytes send.

For a COM server, we maintain a circular buffer. The data is copied into the circular buffer. The actual send is done in the interrupt handler. In this case we return the number of bytes copied into circular buffer.

| | |
|---|---|
| FUNCTION | AsyncReadDataAG_ |
| Parameters | PortNum: Port number to which to recv data.<br>count: number of bytes of data to read.<br>Buffer: FAR pointer to the buffer to copy data into |
| Returns | No of bytes read. |

AG 2813 and TELNET 2817 calls AsyncReadDataAG to read data from async buffer. They make a call first to check if there is some data to be read by calling AsyncGetRxCount, which returns the number of bytes left in the queue. If any data is there AG/TELNET makes the read call. Along with the read call they supply the buffer to read and the number of bytes to read.

| | |
|---|---|
| FUNCTION | AsyncGetRxCount_ |
| Parameters | PortNum: Port number to which to recv data. |
| Returns | the current no of bytes pending to be read |

This function is used by TELNET/AG to check if there is any data to be read of the port. This function returns the no of bytes of data left in the async receive buffer.

| | |
|---|---|
| FUNCTION | AsyncGetTxCount_ |
| Parameters | PortNum: Port number to which to recv data. |
| Returns | the current no of bytes pending to be send |

This function returns the no of bytes of data left in the async transmit buffer. Functions in msl.c

| | |
|---|---|
| int | AsyncResetPort (BYTE PortNum) |
| | This resets the ports and sets the port to the configured parameters (baud rate, line format) |
| | This function is called only on a free port |
| int | AsyncDropConnection (BYTE PortNum) |
| | This function drops the current connection and brings back the port to the initial state sets the port to the configured parameters |
| int | AsyncSetModemStatus (BYTE PortNum) |
| | This is to set the modem status DTR & RTS |
| int | AsyncGetModemStatus (BYTE PortNum) |
| | Gets the modem status register |
| int | AsyncGetLineControl (BYTE PortNum) |
| | Gets the Line Control register |
| int | AsyncSetLineControl (BYTE PortNum, BYTE LineFormat) |
| | Sets the Line Control register |
| ULONG | AsyncGetBaudRate (BYTE PortNum) |
| | returns the baudrate used for that port |
| int | AsyncSetBaudRate (BYTE PortNum, ULONG Rate) |
| | Sets the baud rate to 'Rate' |
| int | AsyncFlushRxBuffers (BYTE PortNum) |
| | Clears the Rx buffer |
| int | AsyncFlushTxBuffers (BYTE PortNum) |
| | Clears the Tx buffer |
| BYTE | AsyncGetPortStatus (BYTE PortNum) |
| | Gets the current port status. |

```
            NOT_READY         0    ;port is being inited
            RN_WAIT           1    ;port is free rn alone waiting for call
            RN_AG_WAIT        2    ;port is free rn/ag waiting for call
            RN_PORT           3    ;Rn is using the port
            AG_PORT_IN        4    ;AG is using the port
            AG_PORT_OUT       5    ;AG is using the port
            AG_CALL_CAME      6    ;AG is using the port
            WAITING_TO_CALL   7    ;AG/RN is waiting to call back the client
            CALLING_BACK      8    ;AG/RN is calling back the client
            PORT_DISABLED     9    ;port is disabled
            TELNET_PORT       10   ;TELNET on port
            RUNNING_SCRIPT    11   ;script is running on port
            OUT_OF_SERVICE    12   ;port is put out of service by administr
            DOWN_ON_DEMAND    13   ;lan to lan port down due to no activity
```

| | |
|---|---|
| int | AsyncSetPortStatus (BYTE PortNum, BYTE Status) |
| | Sets the port status the parameter Status |
| | return TRUE on success, FALSE on fail (because the port status cannot be changed to that value) |
| int | AsyncSendBreak (BYTE PortNum) |
| | Send break to the port. |
| BYTE | AsyncIsDirectConnect (BYTE PortNum) |
| | return 0 if a modem is connected |
| | return 1 if is directly connected |
| void | AsyncGetLineVars (BYTE PortNum,LineVarsType *LineVar) |
| | Fills the LineVar structure for the port |
| | BYTE GeneralName [GEN_NAME_LEN]; |
| | BYTE SpecificName [SPEC_NAME_LEN]; |
| | BYTE LineType; |
| | LineParamType LineParams; |
| | WORD MaxPktSize; |
| | WORD MaxIntPktDelay; |
| | ULONG IdleTime; |
| int | AsyncModemDial (BYTE PortNum, char far *Number) |
| | Dials a phone number. |
| void | AsyncGetCardInfo (BYTE PortNum, ISIcardInfoType *CardInfo) |
| | Fills the card info structure |
| | WORD BaseAddr; base addr of port |
| | BYTE NoOfPorts; No of ports in card (1 for COM, 8 for ISI) |
| | BYTE IRQ; irq used by card |
| | BYTE CardType; (COM 0, ISI608 1) |
| BYTE | AsyncConnectionMade (BYTE PortNum) |
| | Returns true if RN/Ag is using port, else 0 |
| BYTE | AsyncGetEIA (BYTE PortNum) |
| | Gets the EIA status of the ports |
| | (DCD, RI, DSR, CTS, 0, 0, RTS, DTR) |
| void | AsyncSetUserNameIndex (BYTE PortNum, BYTE *UserName) |
| | Set the name of the user using the port |

Notes for direct Connection:
   No modem initialization is done for Direct Connect ports.
   For an inbound connection <CR> starts the connection. For PPP 2805 a PPP
packet starts the connection.
COM   Transmit Interrupt handler
1.    Find out on which port the interrupt came on.
2.    If it is not a Transmit interrupt get out.

-continued

```
3.      Check if transmitter flown off.
4.      if port belong to RN
            If a pending transmit data in queue send it.
5.      else
            If any data in circular buffer send it.
6.      Enable all interrupts
7.      iret
Receive Interrupt handler
1.      Find out which port the interrupt came on
2.      If not receive interrupt get out
3.      If port not owned
            if first char is ppp delimiter
                Assign that port to RN
                call the RecvStateMachine for PPP
            else if there is a inbound connection waiting
                Assign port to AG
                copy data into circular buffer
                do flow control if necessary
4.      Else
            if port belongs to AG
                copy data into circular buffer
                do flow control if necessary
            else Call RecvStateMachine for PPP
5.      Clear all interrupts
6.      iret
```

Design document for MTSLSL

RNSERVER is designed to work on top of any 16 bit ethernet driver written to Novell ODI specifications.

The ethernet driver for RNSERVER has two modules. A protected mode one, and a real mode portion. The protected mode portion of the driver talks to the real mode portion to send and receive packets.

The real mode portion talks to the ODI driver for the achieving the same.

This real mode portion of the driver is MTSLSL.

In Novell ODI terms MTSLSL is a protocol stack.

The following diagram (FIG. 19) illustrates the setup.

MTSLSL 3201 picks up packets from ODI MLID 3205 and queues it up in conventional memory. The Ethernet driver for RNSERVER 3207 looks into the queues maintained by MTSLSL 3201 and processes the packet.

For transmission, Ethernet driver for RNSERVER 3207 makes an Event Control Block describing the packet and calls MTSLSL 3201 with the Event Control Block. MTSLSL 3201 then tries to send the packet described by the Event Control Block. MTSLSL design issues:

MTSLSL 3201 registers to Novell LSL 3203 as a prescan stack. It puts itself in the first position in the prescan chain LSL 3203 maintains. This makes sure that whenever a packet is received, MTSLSL 3201 gets the first chance to look at the packet. This is desired because we need to demultiplex packets that are meant for IPXODI stack (our IPX app AG) and the ones that are meant for the Router.

This kind of situation will arise because, RNSERVER could be doing routing on the frame type IPXODI is bound to. Hence we will have to distinguish between packets that are meant for IPXODI and packets that are to be routed.

One more way to do this would be NOT to distinguish between packets meant for IPXODI and Router BUT give the packets that arrive on that board to BOTH. This involves procedures like resubmitting the ECB to LSL and so on. By a few experiments this procedure has found to be slow.

Consider the following scenario.

RNSERVER is doing IPX routing on frames 802.3 and 802.2.

IPX on RNSERVER is bound to 802.2

A file server on the LAN has only 802.2 enabled on its board.

A workstation running MCSI redirector software has IPXODI bound to 802.3 (This means this Workstation is connected to the File Server thru RNSERVER).

RNSERVER—PC RNS

File Server—PC FS

Workstation—PC WSTN

Now suppose WSTN wants to grab a line of RNSERVER for dialing out.

WSTN gets the IPX address of RNSERVER thru SAP.

Now WSTN makes a IPX connect request to RNS.

This request will come on 802.3 to RNS the router because IPXODI on RNS is bound to 802.2.

Now RNS knows that it can reach 802.2 network and just sends this packet out. This packet has the source and destination MAC address as the same since the packet is meant for AG running along with RNS. Hence this packet will not be seen by the NIC on the RNS PC. Thru prescan chaining and ECB resubmit suppose RNS gives the packet to IPXODI.

Now IPXODI has to reply back to the connect request originally sent by WSTN.

IPXODI knows that the destination is on a different network from it since the network address differs. (RNS IPXODI is on 802.2 and WSTN is on 802.3)

IPXODI on RNS issues a broadcast for the net address of 802.3 network and WAITS for a response.

This packet may get to RNS because of Resubmit procedure. But RNS cannot respond because RNS does not get a chance to process the packet since IPXODI does not release control.

The packet does get to the queues of MTSLSL. But since RNS packet processing is done in the foreground and NOT as when the packets arrive, and because IPXODI is in a dead WAIT the system appears to come to a stand still. After IPXODI times out (this is about 40 seconds) the system returns back to its normal state.

Design document for certain parts of TCP implementation

Index

1. Some General Notes
2. Segment Receive Handling
3. Segment Send Handling

4. Retransmission
5. Urgent Data Processing
6. PUSH Handling
7. Buffer Management
8. Connection Termination
9. Flow Control
10. Delayed Acknowledgments
11. Nagle's Algorithm
12. Silly Window Syndrome (SWS) Avoidance
13. Sliding Window
14. ICMP Support
15. Probing Zero Windows (Persist Timer)
16. Integration with RouterWare
17. Initialization of Connection Record Fields
18. Aborting Connections
19. ?? Points
20. FIN handling
21. Security and Precedence
22. Sequence Numbers
23. Determining the available free space in the send window

1. Some General Notes

The way RouterWare operates, all processing always takes place in the foreground with each process getting turn one by one. SO IN ALL PLACES, THERE IS NO NEED TO TAKE CARE OF CRITICAL SECTIONS OR MULTIPLE ACCESS TO CRITICAL DATA SPACE.

(At least this assumption is made in the code)

2. Segment Receive Handling

During init a receive window is set up. The window is a physical buffer. On each ACK or other packet sent from the receiving side to the sender, the CURRENT window size is advertised. The receive buffer is used as a circular queue with the indices 'last' and 'first'. EACH CONNECTION has a receive window.

Data Space:
Each connection record has the following fields related to receive.
buf_size—SIZE of the fill receive window; always constant
first—INDEX to the first location in receive window from where an app's socket receive can pick up bytes; updated only when app picks up bytes
filled—COUNT of bytes from 'first' that are valid for being picked up by a socket receive; updated on segments received and app picking up bytes
nxt—SEQUENCE NUMBER of next segment expected from TCP sender; updated on successful segment receives
buf—ptr to receive window buffer; always constant
Always,
Number of bytes received='filled'
Next advertised window size=Full window size—'filled'
Next ack number='nxt'

Acknowledgment Handling:
1. ACK for a received segment will be done by a timer process or any other send that may take place (piggybacking).
2. On a segment received and filled into the receive window, set a flag indicating that an ACK is due. The timer process will delay and ACK appropriately.
3. If a received segment indicates a proper receive, by detects a lost segment or a checksum error, force an IMMEDIATE ACK and don't flag a delayed ACK.

Special Decisions:
1. Drop segments that can cause holes in the receive window (i.e., the new segment falls within the receive window, but some segment in between is not received yet).
   DANGER:
   If the sending TCP has some algorithm (the RFC tells how to detect if only a segment or part of it in between a window is lost) to detect lost packets at the send end, it may take time to send.
   When a segment is dropped this way, if the segment had the FIN control bit is set, it is ignored and expected that the other end will retransmit the FIN bit too. We could keep the info for delayed action perhaps, but this is easier.
2. The receive window size will be about 1024+512 bytes (just >1518 (ethernet max). This is because the only TCP app we support is TELNET which deals most of the time with small packets.

Initialization:
Program Init
For the specified max number of connections allowed, receive window buffers are allocated for each connection (each of 1536 bytes) and ptrs in the connection record are set to point to the respective buffers. 'wnd' is filled. filled=first=nxt=0.

Connection init
nxt=init receive sequence number
Actions on Segment reception
1. Check if the received packet or PART of it will fall within the receive window.
2. If so, check if the sequence number is same as expected.
3. If so, copy all or part of the packet, update 'nxt', flag for an ACK.

3. Segment Send Handling

Send can be viewed in many ways
1. Send as initiated by an app using a SEND or WRITE socket call.
2. Send as initiated by an internal TCP process to retransmit a previous segment.
3. Send as initiated by an internal TCP process that finds that a send has to be done.

Internally, TCP will maintain a send window. This is a physical buffer of size 1536 (enough for TELNET). When a socket SEND or WRITE is done, the send or write will fill this send window to the extent possible and return an appropriate value to the calling app (0 or the number of bytes copied to the send window). A separate process will periodically check the send window and decide if an actual physical send has to be done. If so, the sending action is done. As per specs, send is done to the window size and then an ACK is waited for. When an ACK comes in, the send window is updated accordingly. On each physical send, a retransmit timer is started. When the timer expires, if the ACK has not come in, the same segment is retransmitted.

Each connection record has the following fields related to send.

| | |
|---|---|
| una | last unacknowledged SEQUENCE number; updated whenever a proper ACK is received to the value ACK'ed |
| nxt | next SEQUENCE number to use; updated on a physical packet send to current value + size of data sent; every SYN bit counts as one more sequence number |
| filled | COUNT of bytes freshly addeded to the window to send; updated when an app fills the send window thro' a socket call (incr) and when a segment is sent out on the network the first time (decr); beware -- this does not tell how many bytes are in the send window |
| buf | PTR to the send window buffer; always constant |
| bstart | INDEX to first UNACK'ed byte in buffer; retransmissions will be considered from this point onwards and this corresponds to the 'una' sequence number; updated when 'una' is updated |
| bnext | INDEX to first freshly added byte (from where 'filled' count starts) and this corresponds to the 'nxt' sequence number; updated every time 'nxt' is updated |
| buf_size | MAX buffer space for the send window; always constant SIZE of the |
| wnd | CURRENT send window; variable size; updated from received packets when it is safe to do so -- i.e. when a ACK signaling all of window was successfully received arrives |
| lwseq | SEQUENCE number of incoming segment the last time the window size 'wnd' was updated |
| lwack | ACK SEQUENCE number of incoming segment the last time the window size 'wnd' was updated |
| mss | max seg size as learnt from window advertisements from the receiving end; updated each time a segment is got |

Computation nxt—una: number of bytes yet to be ack'ed and so possibly included for retransmission filled: fresh bytes added; in case of a retransmission, number of bytes send=(nxt—una)+filled Always, Send will take place so long as there are bytes within the send window The "current send window" is the filled portion of the "fuill send window"

The "full send window" can be throttled from the receiving side using window advertisements.

Special Decisions

1. The send window will have a max of 1536 bytes and all incoming window adverts will the shortened to this size if required. Our app is only TELNET after all.

Maybes:

1. Maybe we need not support using the Window advertisements and can always NOT allow the sliding window to shrink or grow. Our app is just telnet which will not put so much demand on the network. Prob. is what will people think if they notice that we are doing such a thing, huh?

Initialization

Program Init:

For the specified max number of connections allowed, send window buffers are allocated for each connection (each of 1536 bytes) and ptrs in the connection record are set to point to the respective buffers. 'wnd' and 'buf_size' are filled. filled=firstmnxt=0.

Connection init wnd=window size nxt=isn

4. Retransmission

As soon as a segment is transmitted, info regarding the segment is entered into a structure (RTX_INFO_RECORD) and the structure queued in a queue of segments that have been transmitted on a connection and not yet acknowledged.

The timer process checks if this queue is non-empty and increments a counter. When the counter reaches a max value (RTO value), a retransmit function is called. In the process the bit-flag TCPF_RTXON is set. When this flag is on, Karn's Algorithm is in progress with regard to estimation of round-trip-time.

Whenever a segment with an ACK comes in, the ACK number is checked to see what all segments in the retransmit queue are acknowledged and appropriately the retransmit timer may be stopped and queued segments may be deleted.

Retransmission uses the following fields in each connection record rtx_retries: number of times a retransmit will be retried; if this reaches a configured max, the connection will be aborted rtx_counter: incremented on each timer tick if there are any queued items in the retransmit queue; if this reaches a max value as signified by the retransmit timeout, then retransmission is attempted rtx_timeout: computed estimate of the timeout to be used on retransmission; computed by using Jacobson's algorithm of the RTT estimates conn_flags: the bit TCPF-RTXON set indicates Kam's algorithm is in action.

rtx_queue: ptr to linked list of segments awaiting acknowledgment.

Special Decisions

1. The RFCs are not clear as to what to put a retransmit timer on—just the first unacked segment or all segments in the retransmit queue. When the timer expires, the first segment in the retransmit queue will be retransmitted and the timer restarted for the same segment. If the segment is subsequently ack'ed, then the retransmit timer will be restarted for the next element in the retransmit queue. This will actually increase the length of time we wait for an ack for the next element in the retransmit queue.

2.

38 as mentioned in RFC 1122, Host Requirements, will not be done on retransmission. Instead of keep the full segment even though part of it is ack'ed, we could update globals suitably only the unacked part is kept track of. Only thing is take care of the 'send_una_amount' variable properly (see point 23).

Some modification done so that if partial segment is acked, that much free space is made available.

Retransmit Timeout Calculation

The method of calculation is the same as mentioned in the RFC 793—Jacobsons method combined with Karn's algorithm.

When a segment is sent, if the TCPF—TIMEACK flag in the 'conn_flags' field is not set, the current timer tick count is stored in the field 'last_seg_sent_tick' field of the connection record. Next time an ACK comes and the ACK does not ACK a retransmit but has a ack value greater than or equal to the sequence number of the segment that was sent, and the TCPF_TIMEACK flag is set, the flag is turned off and a rough round trip estimate is made as below current rtt=current tick count—last_seg_sent_tick Using this estimate, the Jacobson's algorithm to compute retransmit timeout is used. The field 'seg_for_rtt_estimate' will hold the sequence number for which the current RTT will be estimated.

If the TCPF_RTXON flag is set then this estimation of time is not done and Karn's algorithm of exponential backoff is done.

If a retransmitted packet gets an acknowledgment, the TCPF_RTXON flag will be reset. Then the round-trip-time estimator will start working again.

Initial round-trip-estimate is as mentioned in the RFCs.

Retransmission of SYN and FIN segments

The way we have implemented our TCP, SYN and FIN segments travel alone and never piggy-backed with data. So whenever a SYN or FIN segment is sent, such segments are also added to the retransmit queue, but with 0 segment length. On retransmission, if a 0 segment length segment is found, and the current state is anything before "established", the segment is treated as indicating a SYN segment. Else it is treated as indicating a FIN segment.

When a segment with the URG bit set comes in, we call an application (TELNET) registered function informing the app that there was some urgent data. The app function simply increments a counter based on how many times the function was called. This counter is decremented whenever a "Data Mark" (DM) is encountered in the received stream. This much is sufficient for TELNET.

The urgent pointer field IS IGNORED and the urgent data is added to the normal data stream (receive window). Since we ignore the urgent pointer field, we also neatly side-step the BSD implementation versus the other TCP implementation problems.

The TCP_PER_CONN structure will have a field that will point to a callback structure. Apps can register a callback function thro' a call provided in the TCP software. This call should be called after socket ( ) and bind ( ) calls. Call is register_urg_func_with_tcp (socket-descriptor).

BUT:

What happens when the receive window is throttled to a size of 0. As per specs we still need to do out-of-band processing, but here we can't do so.

6. PUSH Handling

If PSH bit is set in an incoming segment, when the segment is processed a flag (TCPF_RECVPSH) is set in the connection record. This flag is acted upon when a socket receive is called and reset then.

All socket send calls result in a flag (TCPF_SENDPSH) being set. The send routine will send as much as there is data and all data in the send window if this flag is set and resets the flag.

The flag is a bit flag in the 'conn_flags' field of the connection record.

Note that the method of handling PSH on receives will work without the jugglery as described in Comer's book (Internetworking with TCP/IP, Volume 2, Chapter 15), because we will not be queuing segments that arrive out of sequence.

7. Buffer Management

Socket sends, fill up the send window. The send process, checks on the send window and does send by alloc'ing a buffer (tcp_get_user_buffer( )), filling it and sending it. This buffer sent is queued up in the retransmit queue. The transmit completion post routine will NOT free the sent buffer as it is still needed for retransmit purposes. The buffer will only be freed (tcp_free_user_buffero( )) when ACK for the segment queued for retransmit is received.

Also when aborting connections, all queued retransmit buffers will be freed.

Send and receive window buffers are allocated when the app attempts to set up a connection. Connection is disallowed if a buffer cannot be allocated. This scheme does not lock up buffers if connections do not exist.

8. Connection Termination

Since only a TELNET app is envisaged, the connection termination is only a passive close operation which causes the TCP state machine to move from the ESTABLISHED state to the CLOSE_WAIT state to the LAST_ACK state.

In the CLOSE_WAIT state, the server will issue a socket CLOSE call. The close will set a bit (TCPF_SENDFIN) in the connection 'conn_flags' field.

TCP will then send out a FIN segment as a separate segment (without any data or other control bits). This segment is sent only when all data in the send window has been sent out (though may not be ack'ed yet) and the TCPF_SENDFIN flag is set when checking in the router foreground. The FIN segment sent out is also added to the retransmit queue to wait for an ACK in response.

9. Flow Control

The congestion control algorithms are not implemented (as we will be having only a TELNET session). Consequently the send window won't close to 0 perhaps.

10. Delayed Acknowledgments

ACK's will be delayed by 200 ms as in BSD unix (explained in R. Stevens—TCP/IP Illustrated, Vol. 1). There is a single timer that goes off every 200 ms. When this timer expires, all sessions are checked for pending ACK's and an ACK segment is sent out.

11. Nagle's Algorithm

12. Silly Window Syndrome (SWS) Avoidance

Receive side:

Our implementation is as per the explanation in Richard Stevens' book TCP/IP Illustrated, Vol. 1:

Related fields in connection record:

recv_last_advert—last advertised window size from the receive side

Send side:

Incorporated in a minimal form. See "tcp send fgnd( )".

Related fields in connection record: send_max_advert—max of received send window advertisements

13. Sliding Window

Note that in our current design, sliding window is implicit. Packets will be sent to window size. Window is unusable as long as the sent packets are not acknowledged (our retransmit stuff is kept in the send window itself).

14. ICMP Support

ICMP message that need to be supported are
Source Quench
   Congestion control message
Destination Unreachable
   Inform socket app or abort connection based on error code
Time Exceeded
   Inform socket app
Parameter Problem
   Inform socket app

15. Probing Zero Windows (Persist Timer)

Our implementation is as below
1. When a valid zero window advertisement is got, if the retransmit queue is not empty, the contents of the retransmit queue will behave as a window probe on each retransmit. So nothing is done. If the retransmit queue is empty, a persist timer is started.
2. When the persist timer expires, and there is some data to be sent, a 1-byte data packet is sent and added to the retransmit queue. If there is no data to be sent nothing is done.
3. On a socket send, if something enters the send window and the retransmit queue is empty and the send window size is 0 and the persist timer is 0, a 1 byte probe packet is prepared and sent and added to the retransmit queue.
4. From here on, the retransmit mechanism takes over. A variation is that if the send window is 0, the retransmit will go on forever without aborting connection.

Special decision
1. The initial persist timer value is the same as the initial retransmit timeout.

16. Integration with RouterWare

Specialities are
1. Initialization method—The init function needs to be supplied to a init table maintained in global data space.
2. Configuration method—RouterWare has a different kind of string based configuration methodology that we support.
3. How TCP stack gets control—
   On packet reception—Rx routine is called by IP layer
   On timer tick—the timer function is called which also behaves as our foreground
   A control entry point—called sometimes (mostly during init) by LSL.

17. Initialization of Connection Record Fields

Conn. record fields are inited when you acquire a free connection record. Init is done to default. It is at these times that the send and receive windows (buffers) are allocated.

When a record is freed, the corresponding buffers are deallocated.

During the progress of the connection state machine, the fields will change values.

18. Aborting Connections

When aborting TCP connections, the connection record state is changed to the CLOSED state. CLOSED state records are not usable by anyone for any purpose. These are not actually free. CLOSED state records will become FREE (usable for future connections) when the socket user makes a socket call and realizes that the connection has closed due to some error.

19. ?? Points

Since the TCP is assumed to be used only by a server app, in certain areas of the code, support for TCP client software are not fully implemented or the support is weak. Such areas are commented with the comments appearing between double question (??) marks. Search the text for such comments if implementation is desired.

20. FIN handling

We will accept a FIN in a segment only if it comes after all data has been acknowledged.

21. Security and Precedence

NOT IMPLEMENTED

22. Sequence Numbers

All sequence number fields and variables should be of type TCPSEQ. This is a signed long to take care of comparisons in the face of wrap arounds in the integer number space. See Douglas Comers'book Internetworking with TCP/IP Vol 2. (the first chapter on TCP) for an explanation on this.

23. Determining the available free space in the send window

To determine free space, a new field is added—'send_una_amount' to each connection record.
Whenever a regular send is done, this counter is incremented by the send amount. And whenever an acknowledgment occurs, this counter is decremented by the amount of data acknowledged. So it will accurately reflect the amount of unacknowledged data. Using this variable, free space in the send window can be computed as send_buf_size_(send_filled+send_una_amount)
      'send_filled' keeps track of amount of data in the send window that has not been sent even once.
   Design of RNTelnet Server
Requirement:
   The Telnet client in a LAN with the RNServer up should login to a remote Unix machine using the modem lines of RNServer.
Design:
   A Telnet server accepts key strokes from the Telnet client and returns screen images in response to the key strokes.
   The RNTelnet server asks for the Password (if it exists) as soon as the client connects and after verifying the password, it presents the Telnet client with a 'menu'.
   The menu contains items like:
1. Connect
2. Disconnect
3. List of lines
4. Change parameters
Connect:
   This option connects the telnet client with the modem line requested if it is free.
Disconnect:
   This option disconnects the telnet client from the modem line to which it has been previously connected.

List of lines:

This option displays the list of modem lines and their status which are connected to RNServer.

Change Parameters:

This option allows to modify the line parameters of modem lines.

This telnet session can only be used to select the modem line from the RNServer. Selection of modem line is made at the client. After selecting the modem, telnet client closes the session and opens another session on different port which is not used by the telnet server, to handle data transfer between RNserver and telnet client. Suitable buffering mechanism is adopted at the server end to facilitate data transfer on the modem line.

Options Negotiated

1. Terminal-Type: Network Virtual Terminal (NVT)

Since not much screen manipulation is needed to present a menu, the Terminal-Type option is not negotiated. Later, certain well-known/common terminals may be supported.

2. Echo

The Telnet server will NOT echo each character that arrives from the client, to avoid delays and reduce processing. Echoing of characters will be done locally by the client.

3. Suppress Go-Ahead

The Telnet server will NOT send a Go-Ahead character to the client after every processing. Since the connection is effectively full-duplex, the Go-Ahead signal is not required. The prompt sent by the server will be an indication to the users that they can enter the next choice.

4. Transmit-Binary

Since the Telnet server will use NVT, binary transmission will NOT be supported. Later, when different Terminal-Types are negotiated, binary transmission will automatically have to be negotiated.

Processing Input

Since the server refuses to Echo characters, clients are expected to locally echo the characters that are typed by the user and also take care of editing character (BS). These clients send the string as soon as <ENTER> is pressed or a TELNET command has to be sent (IP, AO, AYT, EC etc.).

The clients are expected to map their end-of-line character to <CR><LF>NVT sequence. Some clients send this sequence and others send only <CR>.

The TELNET server processes the input as soon as a <CR> is encountered without waiting for the next character to be <LF>. Any <LF>/<NULL> characters are discarded.

Menu Handling

Each menu is identified by an index.
Main Menu—>TMS_MAINMENU
IPX Port Setup—>TMS_IPXPORTSETUP etc.

Corresponding to each of these values is a structure in the menufsmhdlr array.

The structure contains:

| | |
|---|---|
| 1. Menu handler | Function to be called to process the input for this menu. |
| 2. Menu | Pointer to the menu to be displayed |
| 3. Parent Menu | Index of this menuts parent menu. Parent menu is the menu that was displayed prior to displaying this menu. Parent of IPX Port Setup Menu (TMS_IPXPORTSETUP) is IPX Port Information Menu (TMS_IPXPORTINFO). |
| 4. Items | Number ofitems in the menu. |

The structure for a menu can be identified by its index value.

System Management

Working in parallel with the data flow described above is system management firmware 3300 (FIG. 20) executing in the controller 501 on the system manager card 101. The system manager firmware 3300 communicates with the modems 119, the RAS card 121, and the T1 117 or other communication line cards through the management channel (the control bus 151) shown in FIG. 4 and works in conjunction with the RAS software 2800 as illustrated by the configuration 2851, network management 2853 and spanning tree bridge 2855 modules in FIG. 16. The firmware 3300 addresses the various cards in the system and the devices on the cards, reads the card type, resets any of the devices, and sends and receives configuration and status information using the special backplane protocol described in detail below. The management channel 151 consists of serial transmit, serial receive, serial Ready To Send (RTS) lines, and a parallel address channel.

Figure 20:
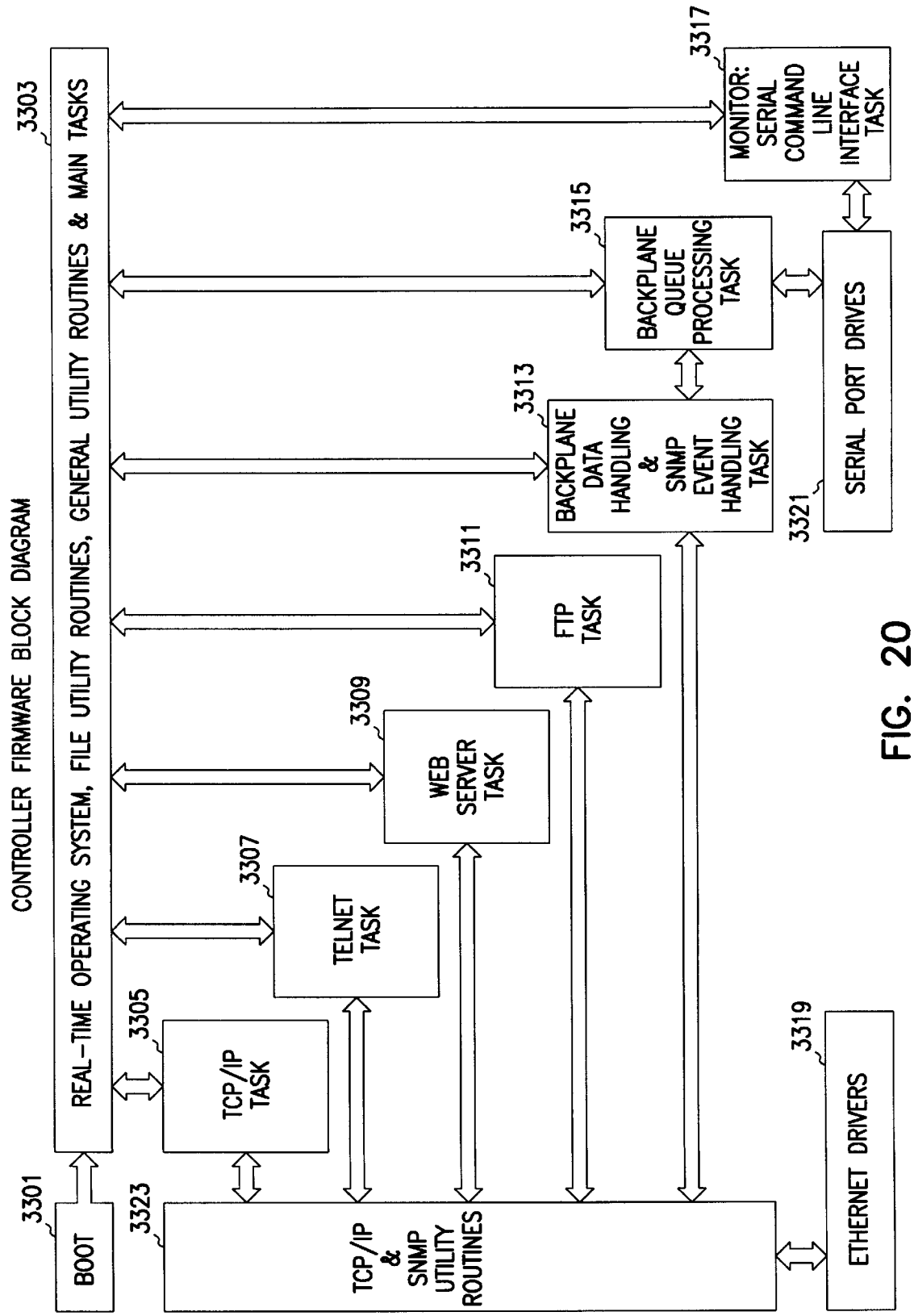
FIG. 20 is a logical block diagram of program modules comprising one embodiment of system manager software executing in a microprocessor on the system manager module shown in FIG. 4.

FIG. 20 is a logical block diagram of the modules comprising the system manager firmware 3300. The boot module 3301 is the first component executed when the device is powered or is started after a reset. The module 3301 performs a power on self test to determine if the basic hardware components are operating. This includes, but is not limited to, cycling LEDs and testing available DRAM 503 and Flash RAM 505. This module 3301 also checks the serial port 253 designated as the monitor port to determine if the module 3300 is to be Flash updated. If the boot detects a Flash update start sequence, the boot code will begin receiving the Flash update and programming the new firmware into the Flash memory 505.

Once the boot processing is complete, control is passed to the main task in module 3303 which will bring up the rest of the system. The main task 3303 is responsible for initializing the entire system including all additional tasks and utility routines. This would include, but is not limited to, memory management, file system, and I/O routines. With the initialization complete, the remaining tasks for the system are started.

The TCP/IP task 3305 controls the receipt and transmission of TCP/IP packets. These packets may be used for Telnet, FTP, HTTP and SNMP operations.

The Telnet task 3307 monitors the TCP/IP port associated with Telnet 2817. This task controls the Telnet command line interface to the system manager controller card 203. Users who wish to remotely manage the system 100 using Telnet use this command line interface. User input is received in the form of Telnet commands which are parsed into command strings. These command strings are processed with the results returned to the remote manager over the Telnet session. A security check is performed to ensure that the remote user has access to this facility.

The web server task 3309 monitors the TCP/IP port associated with HTTP. This task controls the Web Server interface 2821 to the system manager controller card 203. Users who wish to remotely manage the system 100 using HTTP use this Web Server interface 2821. User requests for web pages are received in the form of HTTP commands. These HTTP commands are interpreted and associated with the proper HTML (hyper-text markup language) page which is then sent back to the user. An HTML page may be comprised of HTML formatted text, Image files (GIF), HTML forms, Java Applets and other HTTP links. A security check is performed to ensure that the remote user has access to this facility.

The FTP task 3311 monitors the FTP port associated with FTP. This task controls the FTP interface 2815 to the system manager controller card 302. Users who wish to place files or get files from the system manager controller card 203 use this interface. User requests come in the form of FTP commands. These FTP commands are interpreted and processed. This processing usually involves interfacing with the file utility routines to access files and directories stored on the system manager controller card 203 either in Flash RAM 505 or DRAM 503. A security check is performed to ensure that the remote user has access to this facility.

Core manager processing is done by the Backplane Data Handling & SNMP Event Handling task 3313. Information received from the system devices is processed and recorded here, as well as, information and requested received via SNMP.

Packets received from the devices in the system are processed and recorded by the Backplane Data Handling portion of task 3313. Recording can be in the form of event data logged to a file or updating internal table that keep track of various conditions of the devices.

SNMP "gets" and "sets" are processed by the SNMP Event Handling portion of task 3313. Information that is requested is formatted and returned in SNMP packets. Information that is modified by the SNMP request is updated either as an in memory data structure or in a file. Traps corresponding to event conditions (fault alarms, connection events, etc.) are also sent by this task. If event occurs which warrants the attention of a monitoring SNMP manager, a trap event is generated and sent to the SNMP manager that is monitoring the controller card.

The Backplane Queue Processing task 3315 polls the devices in the system to gather status and fault information and to send configuration and control information. The task maintains send and receive queues for each device in the system.

The Monitor: Serial Command Line Interface task 3317 monitors the serial port 253 on the back of the system 100. This port is used to do initial configuration and setup of the system manager controller card 203. It also provides a command line interface to the controller card 203 for management operations. Command lines are read from the serial port, parsed and processed by the monitor task with the output being sent back to the serial port 253. A security check is performed to ensure that the remote user has access to this facility.

Various utility routines are also performed by the system management firmware. The Real-Time Operating System in module 3303 routines handle task control (start task, stop task, sleep task, etc.), stack manipulation routines, semaphore processing. The File Utility Routines of module 3303 handle file processing routines (open, close, read, write, etc.), directory services routines (make, remove, change, etc.), and media processing routines (formatting, mounting, etc.). The General Utility Routines of module 3303 include miscellaneous routines needed in the operation of the controller card such as memory management routines, time/date routines, text formatting routines, etc.

The system management firmware 3300 also communicates with Ethernet 3319 and serial port 3321 drivers for the Ethernet hub 205 and the serial port 253 on the system manager card shown in FIG. 4. These drivers control the serial communication controllers associated with the Ethernet hub 205 and serial port 253, and control the sending and receiving of data through those interfaces.

The system management firmware 3300 continually monitors the status of the power supplies 201 and a temperature sensor 2905 (shown in FIG. 21) for out-of-bounds conditions and takes appropriate action in case of failure.

Control Bus Protocol

Packets containing system management control signals are send across the MTS bus 1901 in accordance with the protocol disclosed in U.S. Pat. No. 5,450,425 and illustrated in the state machine diagram of FIG. 22. The protocol is designed to provide sync-capability to both the start and the end of a transmitted packet. The start of the packet is indicated by transmitting a starting sequence, which includes two distinct character strings such as a break signal and a starting sync-byte (hexadecimal DD in FIG. 22). The end of the packet is indicated by transmitting and ending sequence, which includes two distinct character strings such as a break signal and an ending sync-byte (hexadecimal CC in FIG. 22). In both instances, the sync-byte is transmitted after the break is received by the receiving end. Preferably, the sync-byte in the starting sequence is a different character string than the sync-byte in the ending sequence.

During the starting sequence, if the byte received after a break signal is the expected starting sync-byte (block 198), it is assumed that the next byte received is the start of the packet (blocks 200 and 202). If the byte received after the break signal is the ending sync-byte, the packet has not been correctly received and the receiving end should communicate to the transmitting end that the packet was not received (block 206). If the byte received after the break signal is an unexpected byte or a time-out occurs, all data received should be considered invalid and discarded (block 196).

If the information received after transmission of the packet is the ending sync-byte (block 204), the packet was properly received and the receiving end can communicate to the transmitting end that the packet was received (block 206). If a starting sync-byte was received rather than an ending sync-byte, there was an error in the packet and it is disregarded (block 200).

If a second break signal was received rather than the ending sync-byte, it is assumed that the packet was properly received and that the second break signal is actually the beginning of a new starting sequence. Thus, the receiving end will process the packet and go into a wait state to wait for the starting sync-byte and the transmission of a new packet (block 198).

Conclusion

The remote communications server system uses a combination of buses, processors, and a segmented design to create a distributed processing communications system having high throughput without the stability problems associated with gigabit bus speeds. The system supports a mixture of different types of communication links and allows the substitution of one service type for another without affecting the remaining communication links. The system is scalable in that segments can be added as needed and the number of lines handled by a segment can be increased.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A communications server system for managing communication sessions between multiple remote users and a network, the communications server system comprising:

a network interface coupled to a plurality of connection segments through a first bus, the network interface operable for receiving outgoing network packets from a connection segment on the first bus and transmitting the outgoing network packets to the network, and for receiving incoming network packets from the network and transmitting the incoming network packets to a connection segment on the first bus;

the plurality of connection segments further coupled to a second bus, each one of the connection segments comprising:

a communications module for coupling to a telephone line and operable for transforming incoming telephone signals from the remote users into frames of incoming data and transmitting the frames of incoming data on the second bus, the communications module further operable for transforming frames of outgoing data received on the second bus into for the remote users; and a remote access server processor for controlling the communication sessions through the one connection segment, the remote access server processor operable for converting the frames of incoming data received on the second bus into outgoing network packets and transmitting the outgoing network packets on the first bus, and for converting the incoming network packets received on the first bus into frames of outgoing data and transmitting the frames of outgoing data on the second bus; and a system manager processor coupled to the plurality of connection segments through a third bus, the system manager processor operable for transmitting commands to each connection segment and for receiving status information from each connection segment on the third bus.

2. The communications server system of claim 1, wherein the communications module of one of the plurality of connection segments comprises:

a T1 connection line interface operable for demultiplexing the incoming telephone signals from the remote users into incoming service channels for transmission on a fourth bus, and for multiplexing outgoing service channels on the fourth bus into outgoing telephone signals for transmission on the remote users; and a plurality of modem modules coupled to the fourth bus, each modem module comprising:

a plurality of modems, each modem operable for demodulating incoming data from a service channel and for modulating outgoing data into the service channel; and a modem module processor operable for receiving the demodulated data from the modems in the modem module and packing the demodulated data into frames of incoming data for transmission on the second bus, the modem module processor further operable for receiving frames of outgoing data from the second bus and sending the outgoing data in the received frames to the modems in the modem module.

3. The communications server system of claim 1, wherein the communications module of one of the plurality of connection segments comprises a primary rate ISDN line interface operable for retrieving the frames of incoming data from a B channel of the incoming telephone signals for transmission on the second bus and further operable for inserting the frames of outgoing data received on the second bus into the B channel of the outgoing telephone signals.

4. The communications server system of claim 1, wherein the communications module of one of the plurality of connection segments comprises:

a primary rate ISDN connection line interface operable for retrieving incoming modulated data from a B channel of the incoming telephone signals into incoming service channels for transmission on a fourth bus, and for inserting outgoing modulated data received in outgoing service channels on the fourth bus into a B channel of the outgoing telephone signals; and a plurality of modem modules coupled to the fourth bus, each modem module comprising:

a plurality of modems, each modem operable for demodulating incoming modulated data from a service channel and for modulating outgoing data into the service channel; and a modem module processor operable for receiving the demodulated data from the modems in the modem module and packing the demodulated data into frames of incoming data for transmission on the second bus, the modem module processor further operable for receiving frames of outgoing data from the second bus and sending the outgoing data in the received frames to the modems in the modem module.

5. The communications server system of claim 1, wherein the communications module of one of the plurality of connection segments comprises a plurality of basic rate ISDN line interfaces, each basic rate ISDN interface operable for retrieving the frames of incoming data from a B channel of the incoming telephone signals for transmission on the second bus and further operable for inserting the frames of outgoing data received on the second bus into the B channel of the outgoing telephone signals.

6. The communications server system of claim 1, wherein the first bus is an Ethernet standard bus.

7. The communications server system of claim 1, wherein the second bus is a 16-bit parallel bus running at 8 megahertz.

8. The communications server system of claim 1, wherein the third bus is a serial bus running at 57,600 bits per second.

9. The communications server system of claim 2, wherein the fourth bus comprises a data bus and a control bus.

10. The communications server system of claim 9, wherein the control bus is an asynchronous serial bus running at 9600 bits per second.

11. A communications server system for managing communication sessions between multiple remote users and a network, the communications server system comprising:

a plurality of connection segments coupled to a first bus, each one of the connection segments comprising:

a communications line interface operable for managing data and control information in incoming telephone signals from the remote users and outgoing telephone signals to the remote users, the communications line interface selected from the group consisting of;

a T1 communications line interface, a primary rate ISDN communications line interface, and a basic rate ISDN communications line interface; and a remote access server processor operable for transforming the data in the incoming telephone signals received from the communications line interface on the first bus into data for the network, and to transform the data from the network into the data for outgoing telephone signals for transmission to the communications line interface on the first bus;

a network interface coupled to the plurality of connection segments through a second bus, the network interface operable for managing data transferred between the remote access server processor for each of the plurality of connection segments and the network; and a system manager processor coupled to the plurality of connection segments through a third bus, the system manager processor operable for controlling operation of the connection segments.

12. The communications server system of claim 11, wherein each connection segment comprising a T1 communications line interface further comprises:

a plurality of modem pools comprising a plurality of modems;

a plurality of modem pool processors coupled to the remote access server processor for the connection segment on a fourth bus, each modem pool processor further coupled to the modems in one of the modem pools and operable for managing data traversing the modems in the modem pool between the T1 communications line interface and the remote access server processor of the connection segment.

13. The communications server system of claim 11, wherein each one of the plurality of connection segments comprising a primary rate ISDN communications line interface further comprises:

a plurality of modem pools comprising a plurality of modems;

a plurality of modem pool processors coupled to the remote access server processor for the connection segment on a fourth bus, each modem pool processor further coupled to the modems in one of the modem pools and operable for managing data traversing the modems in the modem pool between the primary rate ISDN communications line interface and the remote access server processor of the connection segment.

14. A method of distributing processing requirements for communications sessions between multiple remote telephone users and a network, the method comprising:

dividing the communications sessions among a plurality of connection segments;

dedicating a communications line interface to each connection segment to manage data and control information in incoming telephone signals from the remote telephone users and outgoing telephone signals to the remote telephone users;

dedicating a remote access server processor to each connection segment to transform the data in the incoming telephone signals into data for the network, and to transform the data from the network into the data for the outgoing telephone signals;

coupling the communications line interface and the remote access server processor for each one of the plurality of connection segments to a first bus;

assigning a network interface to manage communication between the remote access server processors and the network;

coupling the remote access server processors and the network interface to a second bus;

assigning each communications session in a connection segment to a modem based on control information in the incoming telephone signals;

grouping the modem assigned to each communications session in a connection segment into a plurality of modem pools for the connection segment;

coupling a modem pool processor to the modems in a modem pool to manage data traversing the modems between the communications line interface of the connection segment and the remote access server processor of the connection segment; and coupling the remote access server processor and the modem pool processors in the segment to a third bus.

* * * * *

UNITED STATES PATENT AND TRADEMARK OFFICE
CERTIFICATE OF CORRECTION

PATENT NO.: 6,091,737
DATED: Jul. 18, 2000
INVENTOR(S): Hong et al.

It is certified that errors appear in the above-identified patent and that said Patent is hereby corrected as shown below:

In column 39, line 30 add --one of the plurality of-- after "each" and before "connection".

In column 39, line 30 delete "segment" and insert --segments--, therefor.

In column 39, line 31 add --one of the plurality of-- after "each" and before "connection".

In column 39, line 31 delete "segment" and insert --segments--, therefor.

Signed and Sealed this

Seventeenth Day of April, 2001

Attest:

NICHOLAS P. GODICI

Attesting Officer

Acting Director of the United States Patent and Trademark Office